(12) United States Patent
Wakabayashi

(10) Patent No.: US 7,649,553 B2
(45) Date of Patent: Jan. 19, 2010

(54) ELECTRONIC CAMERA WITH FIRST AND SECOND INSTRUCTION CIRCUITS

(75) Inventor: Tsutomu Wakabayashi, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 11/987,778

(22) Filed: Dec. 4, 2007

(65) Prior Publication Data

US 2008/0117306 A1    May 22, 2008

Related U.S. Application Data

(63) Continuation of application No. 10/359,598, filed on Feb. 7, 2003, now abandoned.

(30) Foreign Application Priority Data

Feb. 15, 2002   (JP) .............................. 2002-038572
Jan. 27, 2003   (JP) .............................. 2003-017135

(51) Int. Cl.
*H04N 5/228*    (2006.01)
*H04N 9/73*     (2006.01)

(52) U.S. Cl. ................................ 348/223.1; 348/222.1

(58) Field of Classification Search .............. 348/222.1, 348/223.1
See application file for complete search history.

(56) References Cited

U.S. PATENT DOCUMENTS

2001/0030694 A1    10/2001    Abe

FOREIGN PATENT DOCUMENTS

| JP | A-01-295241  | 11/1989 |
| JP | A-2000-228746 | 8/2000  |
| JP | A-2001-211376 | 8/2001  |
| JP | A-2001-285689 | 10/2001 |
| JP | A-2002-94910 | 3/2002  |

*Primary Examiner*—Tuan Ho
*Assistant Examiner*—Dillon Durnford-Geszvain
(74) *Attorney, Agent, or Firm*—Oliff & Berridge, PLC.

(57) ABSTRACT

If an image quality 1 "RAW" at which image data are recorded without undergoing image processing is selected at an electronic camera which is already set for WB bracketing, the electronic camera clears the WB bracketing. In addition, the electronic camera prohibits an operation for setting and clearing the WB bracketing if the current image quality setting is the image quality 1 "RAW".

12 Claims, 16 Drawing Sheets

US 7,649,553 B2

ELECTRONIC CAMERA WITH FIRST AND SECOND INSTRUCTION CIRCUITS

INCORPORATION BY REFERENCE

This is a Continuation of application Ser. No. 10/359,598 filed Feb. 7, 2003. The disclosure of the prior application is hereby incorporated by reference herein in its entirety.

The disclosures of the following priority applications are herein incorporated by reference:
Japanese Patent Application No. 2002-038572 filed Feb. 15, 2002
Japanese Patent Application No. 2003-017135 filed Jan. 27, 2003

BACKGROUND OF THE INVENTION

1. Field of the Invention

The present invention relates to an electronic camera that records image data obtained through an image capturing operation executed at an image-capturing element or the like.

2. Description of the Related Art

A white balance (hereafter referred to as WB) adjustment through which a color adjustment is achieved by varying the reference for the color temperature adjustment on image data obtained by capturing an image is executed in an electronic camera. There are cameras in the known art that obtain a plurality of sets of image data through WB bracketing achieved by changing a WB adjustment value in stages and executing WB adjustment processing at various WB adjustment values. At the same time, it is desired that image data obtained by capturing an image be recorded into a recording medium such as a memory card without undergoing image processing.

Since the WB adjustment is part of the image processing, the WB adjustment, too, will be skipped if the image processing is skipped. Thus, if the setting for WB bracketing and the setting for skipping the image processing are both selected, two conflicting operations, i.e., an operation for recording data having undergone image processing and an operation for recording data that have not undergone image processing, are executed. If the two types of data, i.e., the data before and after image processing, are both recorded, storage space in the recording medium is quickly consumed.

SUMMARY OF THE INVENTION

The present invention provides an electronic camera that can selectively record either image data which have not undergone image processing or image data having undergone image processing.

The image-capturing device according to the present invention comprises: an image-capturing element that captures a subject image and outputs image data; an image processing circuit that executes image processing on the image data output by the image-capturing element; a recording circuit that records the image data that have not undergone the image processing or image data having undergone the image processing into a recording medium; a first instruction circuit that issues a first instruction for the image processing circuit and the recording circuit to change a parameter for the image processing in stages and records a plurality of sets of image data obtained through image processing executed by using a plurality of parameters resulting from the change made in stages; a second instruction circuit that issues a second instruction for the image processing circuit and the recording circuit to record the image data output from the image-capturing element without executing the image processing; and a switching circuit that alternatively switches to the first instruction and the second instruction. The image processing may include white balance adjustment processing; and the first instruction may be an instruction for setting white balance bracketing.

The switching circuit may make a selection by giving priority to the first instruction over the second instruction.

The switching circuit may make a selection by giving priority to the second instruction over the first instruction.

The switching circuit may make a selection by giving priority to either the first instruction or the second instruction that has been issued earlier.

The switching circuit may make a selection by giving priority to either the first instruction or the second instruction that is issued later.

The image-capturing device according to the present invention comprises: an image-capturing element that captures a subject image and outputs image data; an image processing circuit that executes image processing on the image data output by the image-capturing element; a recording circuit that records the image data that have not undergone the image processing or image data having undergone the image processing into a recording medium; a first instruction circuit that issues a first instruction for the image processing circuit and the recording circuit to change a parameter for the image processing in stages and records a plurality of sets of image data obtained through image processing executed by using a plurality of parameters resulting from the change made in stages; a second instruction circuit that issues a second instruction for the image processing circuit and the recording circuit to record the image data output from the image-capturing element without executing the image processing; and a control circuit that controls the recording circuit to selectively record either the image data before the image processing or the image data after the image processing if both the first instruction and the second instruction are issued.

The image processing may include white balance adjustment processing; and the first instruction may be an instruction for setting white balance bracketing.

The switching circuit may make a selection by giving priority to the first instruction over the second instruction.

The switching circuit may make a selection by giving priority to the second instruction over the first instruction.

The switching circuit may make a selection by giving priority to either the first instruction or the second instruction that has been issued earlier.

The switching circuit may make a selection by giving priority to either the first instruction or the second instruction that is issued later.

DESCRIPTION OF PREFERRED EMBODIMENTS

The following is an explanation of the embodiments of the present invention, given in reference to the drawings.

First Embodiment

Figure 1:
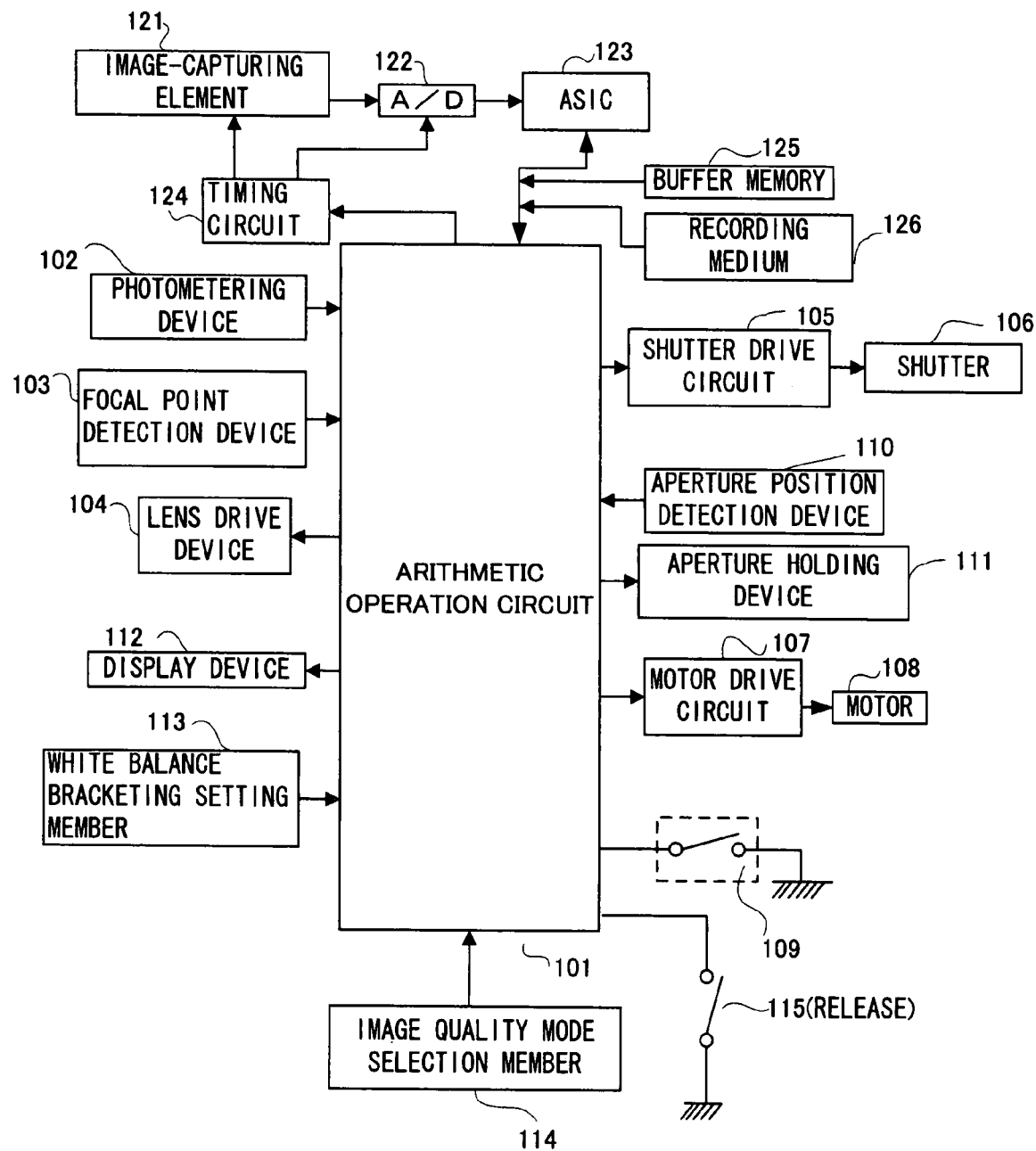
FIG. 1 is a block diagram showing the structure of the electronic camera according to a first embodiment of the present invention.

FIG. 1 is a block diagram showing the structure adopted in the electronic camera according to the first embodiment of the present invention. In FIG. 1, an image-capturing element 121, which may be a CCD, outputs image signals by capturing a subject image. An A/D conversion circuit 122 converts the analog image signals input from the image-capturing element 121 to digital signals. An image processing circuit 123 constituted of an ASIC or the like executes image processing such as a white balance (WB) adjustment on the digital image signals, compression processing for compressing image data obtained through the image processing into a predetermined format, decompression processing for decompressing compressed data and the like. A timing circuit 124 generates a timing signal and outputs a drive signal to the image-capturing element 121 and the A/D conversion circuit 122. A buffer memory 125 is a memory in which image data to undergo various types of processing such as image processing, compression processing and decompression processing are temporarily stored. Image data having undergone compression processing are recorded into a recording medium 126 which may be a memory card detachably mounted in the electronic camera.

An arithmetic operation circuit 101 executes various arithmetic operations including a range-finding calculation for the electronic camera and an apex calculation during a photometering operation and also implements control on the camera operation sequence. A photometering device 102 detects the brightness of the subject and outputs a detection signal to the arithmetic operation circuit 101. A focal point detection device 103 detects the state of the focusing position adjustment achieved through the photographic lens (not shown) and outputs a detection signal to the arithmetic operation circuit 101. A lens drive device 104 drives the focus lens constituting the photographic lens (not shown) to move it forward or backward along the optical axis in response to a command issued by the arithmetic operation circuit 101, and thus adjusts the focusing position of the photographic lens.

A display device 112 displays information indicating the details of the settings selected for the electronic camera in the form of characters and icons. Photographing information including the shutter speed and the aperture is also displayed at the display device 112.

A WB bracketing setting operation member 113, which may be constituted of, for instance, a dial switch, alternately outputs operation signals for setting/clearing the WB bracketing in response to a rotating operation of the dial. The WB bracketing is selected so that a plurality of images resulting from WB adjustment executed at various WB adjustment values are obtained by changing the reference for the color temperature adjustment on image data obtained through an image capturing operation and thus varying the WB adjustment value in stages. In the embodiment, three sets of image data are obtained by changing the WB adjustment value in three stages. In other words, three WB adjustments are executed on the image data output from the image-capturing element 121. During this process, the WB adjustment value may be varied by, for instance, adjusting the mired value. When the mired value is adjusted along the +direction, the image takes on a bluish tinge, whereas when it is adjusted along the −direction, the image takes on a reddish tinge. When a photographing operation is executed by selecting the WB bracketing, image data corresponding to a total of three images, i.e., an image obtained at a WB adjustment value preset at the camera and images, one with more blue and the other with more red relative to the first image, are recorded into the recording medium 126.

An image quality mode selection operation member 114, which may be constituted of, for instance, a dial switch, issues one of the following instructions to the image processing circuit 123 in response to a rotating operation of the dial. Namely, it issues an instruction for the image processing circuit 123, indicating whether or not the image processing is to be executed and also indicating the compression rate to be set for the compression processing, so as to adjust the image recording quality at which the image data are to be recorded into the recording medium 126. The image recording quality may be set at one of the following five levels, for instance.

Image quality 1 "RAW" at which the image data are recorded directly, without undergoing image processing Image quality 2 "TIFF" at which the image data having undergone image processing are recorded in an non-compressed state Image quality 3 "FINE" at which the image data having undergone image processing are recorded at a compression rate of approximately ¼

Image quality 4 "NORMAL" at which the image data having undergone image processing are recorded at a compression rate of approximately ⅛

Image quality 5 "BASIC" at which the image data having undergone image processing are recorded at a compression rate of approximately 1/16

A shutter drive circuit 105 implements control so that the front curtain and the rear curtain (not shown) of a shutter 106 are individually held/released. An aperture position detection device 110 detects the aperture position corresponding to the aperture value and outputs a detection signal to the arithmetic operation circuit 101. An aperture holding device 111 stops the aperture being driven and holds the aperture at a specific aperture value.

A motor drive circuit 107 controls the drive of a sequence motor 108 in response to a command issued by the arithmetic operation circuit 101. The sequence motor 108, which constitutes a sequence drive device (not shown), moves a mirror (not shown) up/down, drives the aperture (not shown) and charges the shutter 106. A sequence switch 109, which constitutes the sequence drive device mentioned above, generates brake control timing and the like for the sequence motor 108. A shutter release switch 115, which is constituted of a shutter release button, outputs a release operation signal to the arithmetic operation circuit 101.

According to the present invention, concurrent selections of the WB bracketing and the image recording quality 1 are prohibited in the electronic camera. The first embodiment, in particular, is characterized in that; (1) if the image recording quality 1, i.e. "RAW", is selected while the WB bracketing is set at the electronic camera, the WB bracketing is cleared and (2) setting and clearing of the WB bracketing are prohibited while the image recording quality at the electronic camera is set at image recording quality 1, i.e. "RAW".

Figure 2:
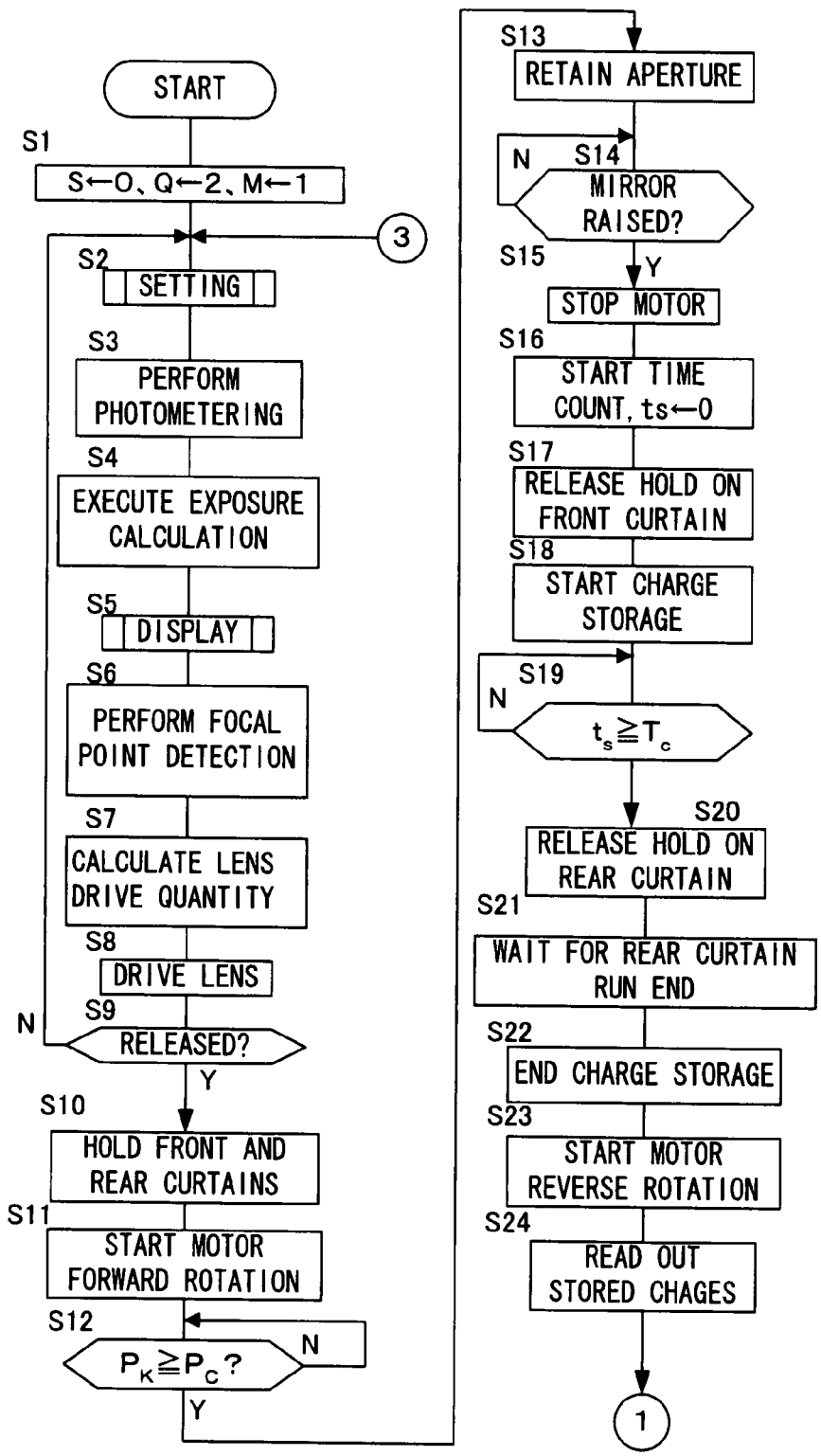
FIG. 2 presents a flowchart of the camera operation processing executed in the arithmetic operation circuit of the electronic camera.
Figure 3:
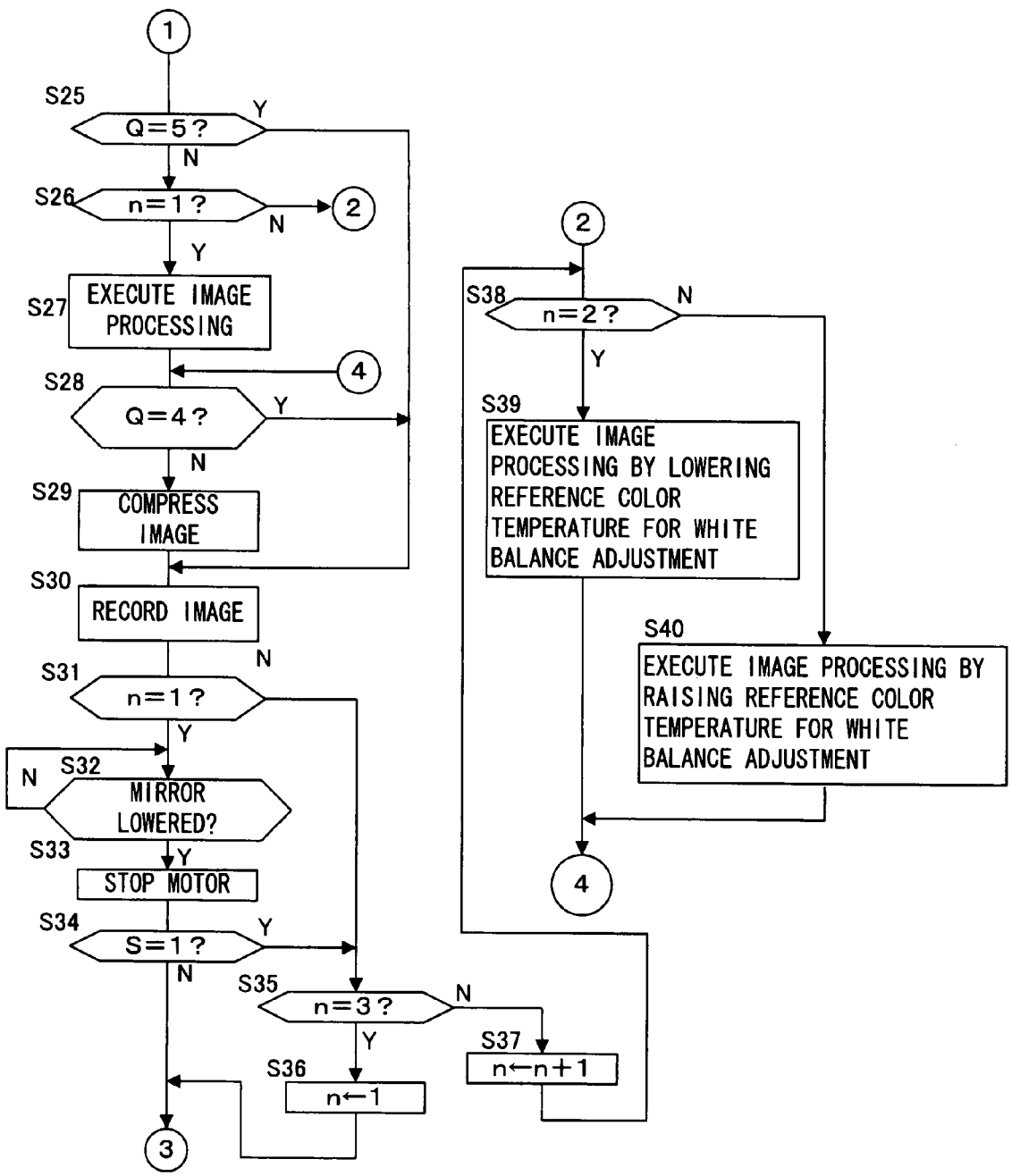
FIG. 3 presents a flowchart of the camera operation processing executed in the arithmetic operation circuit of the electronic camera.

Now, the camera operation processing executed in the arithmetic operation circuit 101 of the electronic camera is explained in reference to the flowchart presented in FIGS. 2 and 3. The program shown in FIGS. 2 and 3, which is started up as batteries (not shown) are loaded into the electronic camera, is repeatedly executed subsequently. In step S1 in FIG. 2, the arithmetic operation circuit 101 selects the following initial settings. Namely, it sets 0 for a WB bracketing flag S, 2 for an image quality mode parameter Q and 1 for a bracketing recording number parameter n, and then the operation proceeds to step S2.

The WB bracketing flag S is set to 1 when the WB bracketing is selected, and is set to 0 when the WB bracketing is cleared. In the initialized state, the WB bracketing is cleared. The image quality mode parameter Q is set to one of five different values 5-1 in correspondence to the selected image recording quality 1-5. In the initialized state, the image recording quality is set to "NORMAL". The bracketing recording number parameter n indicates specifically which image among the plurality of images to be obtained through a plurality of image processing operations (WB adjustment processing operations) in the WB bracketing is undergoing image processing. Since the image processing is executed three times at varying WB adjustment values in the WB bracketing, this parameter n assumes one of the values, 1, 2 and 3 in the embodiment.

In step S2, the arithmetic operation circuit 101 executes setting processing and then the operation proceeds to step S3. The setting processing is to be explained in detail later. In step S3, the arithmetic operation circuit 101 executes a photometering operation to calculate the subject brightness by using the detection signal input from the photometering device 102 and then the operation proceeds to step S4. In step S4, the arithmetic operation circuit 101 executes a specific type of exposure calculation processing and then the operation proceeds to step S5.

In step S5, the arithmetic operation circuit 101 executes display processing and then the operation proceeds to step S6. The display processing is to be explained in detail later. In step S6, the arithmetic operation circuit 101 issues a command for the focal point detection device 103 to detect the state of the focusing position adjustment achieved by the photographic lens (not shown) and then the operation proceeds to step S7. In step S7, the arithmetic operation circuit 101 calculates the drive quantity for the focus lens based upon the results of the detection executed by the focal point detection device 103, before the operation proceeds to step S8. In step S8, the arithmetic operation circuit 101 issues a command for the lens drive circuit 104 to drive the focus lens to the focus-matching position and then the operation proceeds to step S9.

In step S9, the arithmetic operation circuit 101 makes a decision as to whether or not the shutter release switch 115 has been operated. The arithmetic operation circuit 101 makes an affirmative decision in step S9 if an operation signal has been input from the shutter release switch 115 to proceed to step S10, whereas it makes a negative decision in step S9 if no operation signal has been input from the shutter release switch 115 to return to step S2.

In step S10, the arithmetic operation circuit 101 outputs a command for the shutter drive circuit 105 to supply power to magnets (not shown) at the shutter 106 to hold the front curtain and the rear curtain. In step S11, the arithmetic operation circuit 101 outputs a command for the motor drive circuit 107 to start a forward rotation of the sequence motor 108, before the operation proceeds to step S12. Thus, the mirror (not shown) starts traveling upward and the aperture starts to adjust. In step S12, the arithmetic operation circuit 101 counts the number of pulses Pk indicated in the detection signal input from the aperture position detection device 110 and makes a decision as to whether or not a relationship expressed as Pk☐Pc is achieved between the pulse count Pk and the number of pulses Pc corresponding to a control aperture value AVc. The control aperture AVc used in this step is obtained through the exposure calculation processing executed in step S4. The arithmetic operation circuit 101 makes an affirmative decision in step S12 if the relationship Pk☐Pc is achieved to proceed to step S13, whereas it makes a negative decision in step S12 if the relationship Pk☐Pc is not achieved. If a negative decision is made, the aperture is continuously adjusted and the decision making processing in step S12 is repeatedly executed.

In step S13, the arithmetic operation circuit 101 outputs a command for the aperture holding device 111 to retain the aperture and then the operation proceeds to step S14. In step S14, the arithmetic operation circuit 101 makes a decision as to whether or not the mirror-up operation has been completed. The arithmetic operation circuit 101 makes an affirmative decision in step S14 if an ON signal has been input from the sequence switch 109 to proceed to step S15, whereas it makes a negative decision in step S14 if no ON signal has been input from the sequence switch 109. If a negative decision is made in the step, the mirror-up operation is continuously executed and the decisionmaking processing in step S14 is repeatedly executed.

In step S15, the arithmetic operation circuit 101 outputs a command for the motor drive circuit 107 to stop the forward rotation of the sequence motor 108 and then the operation proceeds to step S16. It is to be noted that the sequence drive device (not shown) is configured by ensuring that the aperture becomes completely retained by the aperture holding device 111 before the mirror-up operation ends. In step S16, the arithmetic operation circuit 101 starts a count of a time length ts before the operation proceeds to step S17. The initial value of ts is 0.

In step S17, the arithmetic operation circuit 101 outputs a command for the shutter drive circuit 105 to stop the power supply to a magnet (not shown) at the shutter 106 to release the hold on the front curtain and then the operation proceeds to step S18. As a result, the shutter front curtain starts a run. In step S18, the arithmetic operation circuit 101 engages the timing circuit 104 to start generating a drive signal, thereby starting drive of the image-capturing element 121 and then the operation proceeds to step S19. In response, the image-capturing element 121 starts storing electrical charges in conformance to the intensity of the subject light entering its image capturing surface.

In step S19, the arithmetic operation circuit 101 makes a decision as to whether or not a relationship expressed as ts☐Tc is achieved between the time count ts and a control shutter speed time Tc. The control shutter speed time Tc is obtained through the exposure calculation processing executed in step S4. The arithmetic operation circuit 101 makes an affirmative decision in step S19 if the relationship ts☐Tc is achieved to proceed to step S20, whereas it makes a negative decision in step S19 if the relationship ts☐Tc is not achieved to repeat the decisionmaking processing. In step S20, the arithmetic operation circuit 101 outputs a command for the shutter drive circuit 105 to stop the power supply to a magnet (not shown) at the shutter 106 to release the hold on the rear curtain before the operation proceeds to step S21. As a result, the shutter rear curtain starts a run, thereby blocking the subject light that would otherwise enter the image-capturing element 121.

In step S21, the arithmetic operation circuit 101 allows a predetermined length of wait time to elapse and then the operation proceeds to step S22. This wait time is set to the length of time required by the rear curtain to completely shield the image capturing area of the image-capturing element 121 from light and to complete its run. During the wait time, the image capturing operation is continuously performed at the image-capturing element 121. In step S22, the arithmetic operation circuit 101 stops the count of the time length ts and stops the drive of the image-capturing element 121 by the timing circuit 124 before the operation proceeds to step S23. As a result, the image-capturing element 121 ends the charge storage operation.

In step S23, the arithmetic operation circuit 101 outputs a command for the motor drive circuit 107 to start a reverse rotation of the sequence motor 108 and then the operation proceeds to step S24. In response, the mirror (not shown) starts to move downward and an aperture reset to the open position starts. In step S24, the arithmetic operation circuit 101 outputs a command for the timing circuit 124 to start reading out image signals from the image-capturing element 121, and then the operation proceeds to step S25 in FIG. 3. Thus, the image signals constituted of the stored electrical charges are output from the image-capturing element 121, and the image signals thus output are then converted to digital data at the A/D conversion circuit 122.

In step S25 in FIG. 3, the arithmetic operation circuit 101 makes a decision as to whether or not the image quality mode perimeter Q is set to 5. The arithmetic operation circuit 101 makes an affirmative decision in step S25 if parameter Q=5 to proceed to step S30. In this case, the image recording quality 1 described earlier, i.e., "RAW" at which image data are directly recorded without undergoing image processing, is currently selected. The arithmetic operation circuit 101 makes a negative decision in step S25 if parameter Q☐5 to proceed to step S26. In this case, one of the image recording quality settings 2-5, at which image data having undergone image processing are recorded, is currently selected.

In step S26, the arithmetic operation circuit 101 makes a decision as to whether or not the bracketing recording number parameter n is set to 1. The arithmetic operation circuit 101 makes an affirmative decision in step S26 if parameter n=1 to proceed to step S27, whereas it makes a negative decision in step S26 if the parameter n is set out to 2 or 3 to proceed to step S38. The operation proceeds to step S27 if the image processing to be executed is for the first image being produced through the WB bracketing or if the WB bracketing has been cleared. The operation proceeds to step S38 if the image processing to be executed is for the second or third image being produced through the WB bracketing.

In step S27, the arithmetic operation circuit 101 provides the digital image signals to the image processing circuit 123 and issues an instruction for the image processing before the operation proceeds to step S28. In step S28, the arithmetic operation circuit 101 makes a decision as to whether or not the image quality mode parameter Q is set to 4. The arithmetic operation circuit 101 makes an affirmative decision in step S28 if parameter Q=4 to proceed to step S30, whereas it makes a negative decision in step S28 if the parameter is set to one of the values 1-3 to proceed to step S29. The operation proceeds to step S30 if the image recording quality 2, i.e., "TIFF" at which the image data are recorded without undergoing the compression processing, is currently selected.

The operation proceeds to step S29 if one of the image recording quality settings 3-5, at which compressed image data are recorded, is currently selected.

In step S29, the arithmetic operation circuit 101 issues an instruction for the image processing circuit 123 to execute compression processing before the operation proceeds to step S30. In step S30, the arithmetic operation circuit 101 records the image data into the recording medium 126 and then the operation proceeds to step S31.

In step S31, the arithmetic operation circuit 101 makes a decision as to whether or not the bracketing recording number parameter n is set to 1. The arithmetic operation circuit 101 makes an affirmative decision in step S31 if parameter n=1 to proceed to step S32. In this case, the image processing to be executed is for the first image being produced through the WB bracketing or if the WB bracketing has been cleared. The arithmetic operation circuit 101 makes a negative decision in step S31 if parameter n=2 or 3 to proceed to step S35. In this case, the image processing to be executed is for the second or third image being produced through the WB bracketing.

In step S32, the arithmetic operation circuit 101 makes a decision as to whether or not the mirror-down operation has been completed. The arithmetic operation circuit 101 makes an affirmative decision in step S32 if an ON signal has been input from the sequence switch 109 to proceed to step S33, whereas it makes a negative decision in step S32 if no ON signal has been input from the sequence switch 109 to repeat the decisionmaking processing in step S32.

In step S33, the arithmetic operation circuit 101 outputs a command for the motor drive circuit 107 to stop the reverse rotation of the sequence motor 108 and then the operation proceeds to step S34. In step S34, the arithmetic operation circuit 101 makes a decision as to whether or not the WB bracketing flag S is set to 1. The arithmetic operation circuit 101 makes an affirmative decision in step S34 if S=1 (WB bracketing is currently set) to proceed to step S35, whereas it makes a negative decision in step S34 if S=0 (WB bracketing has been cleared) to return to step S2 in FIG. 2. The operation returns to step S2 if the sequence of the photographing processing has been completed.

In step S35, the arithmetic operation circuit 101 makes a decision as to whether or not the bracketing recording number parameter n is set to 3. The arithmetic operation circuit 101 makes an affirmative decision in step S35 if parameter n=3 to proceed to step S36, whereas it makes a negative decision in step S35 if parameter n=2 to proceed to step S37. The operation proceeds to step S36 if the image processing for the three images produced through the WB bracketing has been completed. In step S36, the arithmetic operation circuit 101 sets 1 for the bracketing recording number parameter n, before the operation returns to step S2 in FIG. 2. Thus, the sequence of photographing processing ends.

The operation proceeds to step S37 if the image processing to be executed is for the second or third image being produced through the WB bracketing. In step S37, the arithmetic operation circuit 101 adds 1 to the value of the bracketing recording number parameter n and then the operation proceeds to step S38. In step S38, the arithmetic operation circuit 101 makes a decision as to whether or not the bracketing recording number parameter n is set to 2. The arithmetic operation circuit 101 makes an affirmative decision in step S38 if parameter n=2 to proceed to step S39. In this case, the image processing to be executed is for the second image produced through the WB bracketing. In step S39, the arithmetic operation circuit 101 outputs a command for the image processing circuit 123 to execute image processing by adjusting the mired value by a predetermined extent along the −direction relative to the reference value and then the operation returns to step S28. As a result, the image processing is executed at a lowered WB reference color temperature.

If, on the other hand, parameter n=3, the arithmetic operation circuit 101 makes a negative decision in step S38 to proceed to step S40. In this case, the image processing to be executed is for the third image being produced through the WB bracketing. In step S40, the arithmetic operation circuit 101 outputs a command for the image processing circuit 123 to execute image processing by adjusting the mired value by a predetermined extent along the +direction relative to the reference value and then the operation returns to step S28. As a result, the image processing is executed at a raised WB reference color temperature.

Figure 4:
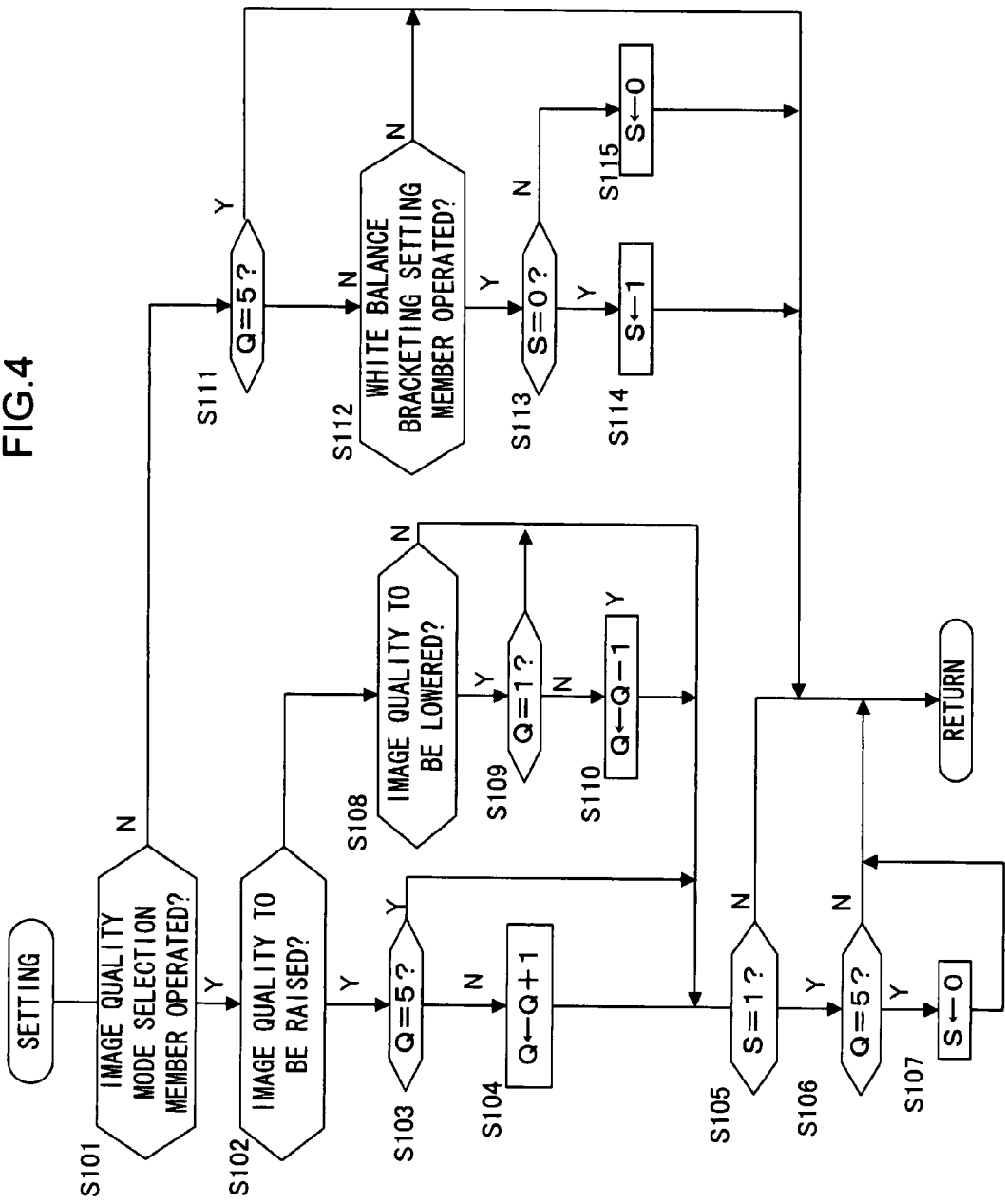
FIG. 4 presents a flowchart of the setting processing.

The setting processing is now explained in detail in reference to the flowchart presented in FIG. 4. In step S101, the arithmetic operation circuit 101 makes a decision as to whether or not the image quality mode selection operation member 114 has been operated. The arithmetic operation circuit 101 makes an affirmative decision in step S101 if an operation signal has been input from the image quality mode selection operation member 114 to proceed to step S102, whereas it makes a negative decision in step S101 if no operation signal has been input to proceed to step S111.

In step S102, the arithmetic operation circuit 101 makes a decision as to whether or not the operation signal indicates an operation for raising the image recording quality. The arithmetic operation circuit 101 makes an affirmative decision in step S102 if the signal input from the image quality mode setting operation member 114 indicates an upward rotation to proceed to step S103, whereas it makes a negative decision in step S102 if the input signal does not indicate an upward rotation to proceed to step S108. The upward rotation may be, for instance, a clockwise rotation.

In step S103, the arithmetic operation circuit 101 makes a decision as to whether or not the image quality mode parameter Q is set to 5. The arithmetic operation circuit 101 makes an affirmative decision in step S103 if Q=5 (the image recording quality is set to RAW) to proceed to step S105, whereas it makes a negative decision in step S103 if Q□5 to proceed to step S104. In the former case, the operation proceeds to step S105 since the image quality cannot be set higher than Q=5. In step S104, the arithmetic operation circuit 101 adds 1 to the value of Q before the operation proceeds to step S105. As a result, the image recording quality is raised by one stage.

In step S108, the arithmetic operation circuit 101 makes a decision as to whether or not the operation signal indicates an operation for lowering the image recording quality. The arithmetic operation circuit 101 makes an affirmative decision in step S108 if the signal input from the image quality setting operation member 114 indicates a downward rotation to proceed to step S109, whereas it makes a negative decision in step S108 if the input signal does not indicate a downward rotation to proceed to step S105. The downward rotation may be, for instance, a counter-clockwise rotation.

In step S109, the arithmetic operation circuit 101 makes a decision as to whether or not the image quality mode parameter Q is set to 1. The arithmetic operation circuit 101 makes an affirmative decision in step S109 if Q=1 (the image recording quality is set to BASIC) to proceed to step S105, whereas it makes a negative decision in step S109 if Q□1 to proceed to step S110. In the former case, the operation proceeds to step S105 since the image quality cannot be set lower than Q=1. In step S110, the arithmetic operation circuit 101 subtracts 1 from the value of Q before the operation proceeds to step S105. As a result, the image recording quality is lowered by one stage.

In step S105, the arithmetic operation circuit 101 makes a decision as to whether or not the WB bracketing flag S is set to 1. The arithmetic operation circuit 101 makes an affirmative decision in step S105 if S=1 (WB bracketing is currently set) to proceed to step S106, whereas it makes a negative decision in step S105 if S=0 (WB bracketing has been cleared) to return to step S3 in FIG. 2.

In step S106, the arithmetic operation circuit 101 makes a decision as to whether or not the image quality mode parameter Q is set to 5. The arithmetic operation circuit 101 makes an affirmative decision in step S106 if Q=5 (the image recording quality is set to RAW) to proceed to step S107, whereas it makes a negative decision in step S106 if Q□5 to end the processing shown in FIG. 4 and proceed to step S3 in FIG. 2.

In step S107, the arithmetic operation circuit 101 clears the WB bracketing and sets 0 for the WB bracketing flag S before ending the processing shown in FIG. 4 and proceeding to step S3 in FIG. 2. Thus, if the image recording quality 1, i.e., "RAW", is selected while the electronic camera is set at for the WB bracketing, the WB bracketing is automatically cleared.

In step S111 to which the operation proceeds after making a negative decision in step S101, the arithmetic operation circuit 101 makes a decision as to whether or not the image quality mode parameter Q is set to 5. The arithmetic operation circuit 101 makes an affirmative decision in step S111 if Q=5 (the image recording quality is set to RAW) to end the processing shown in FIG. 4 and proceed to step S3 in FIG. 2. Namely, if the image recording quality 1, i.e., "RAW", is currently set at the electronic camera, an operation for setting and clearing the WB bracketing is prohibited. The arithmetic operation circuit 101 makes a negative decision in step S111 if Q□5 to proceed to step S112.

In step S112, the arithmetic operation circuit 101 makes a decision as to whether or not the WB bracketing setting operation member 113 has been operated. The arithmetic operation circuit 101 makes an affirmative decision in step S112 if an operation signal has been input from the WB bracketing setting operation member 113 to proceed to step S113, whereas it makes a negative decision in step S112 if no operation signal has been input to end the processing shown in FIG. 4 and proceed to step S3 in FIG. 2.

In step S113, the arithmetic operation circuit 101 makes a decision as to whether or not the WB bracketing flag S is set to 0. The arithmetic operation circuit 101 makes an affirmative decision in step S113 if S=0 (WB bracketing has been cleared) to proceed to step S114, whereas it makes a negative decision in step S113 if S=1 (WB bracketing is currently set) to proceed to step S115.

In step S114, the arithmetic operation circuit 101 sets the WB bracketing and also sets 1 for the WB bracketing flag S, before the processing shown in FIG. 4 ends and the operation proceeds to step S3 in FIG. 2. In step S115, the arithmetic operation circuit 101 clears the WB bracketing and also sets 0 for the WB bracketing flag S, before the processing shown in FIG. 4 ends and the operation proceeds to step S3 in FIG. 2. Thus, unless the image recording quality 1, i.e. "RAW", is currently set at the electronic camera, an operation for setting and clearing the WB bracketing is enabled.

Figure 5:
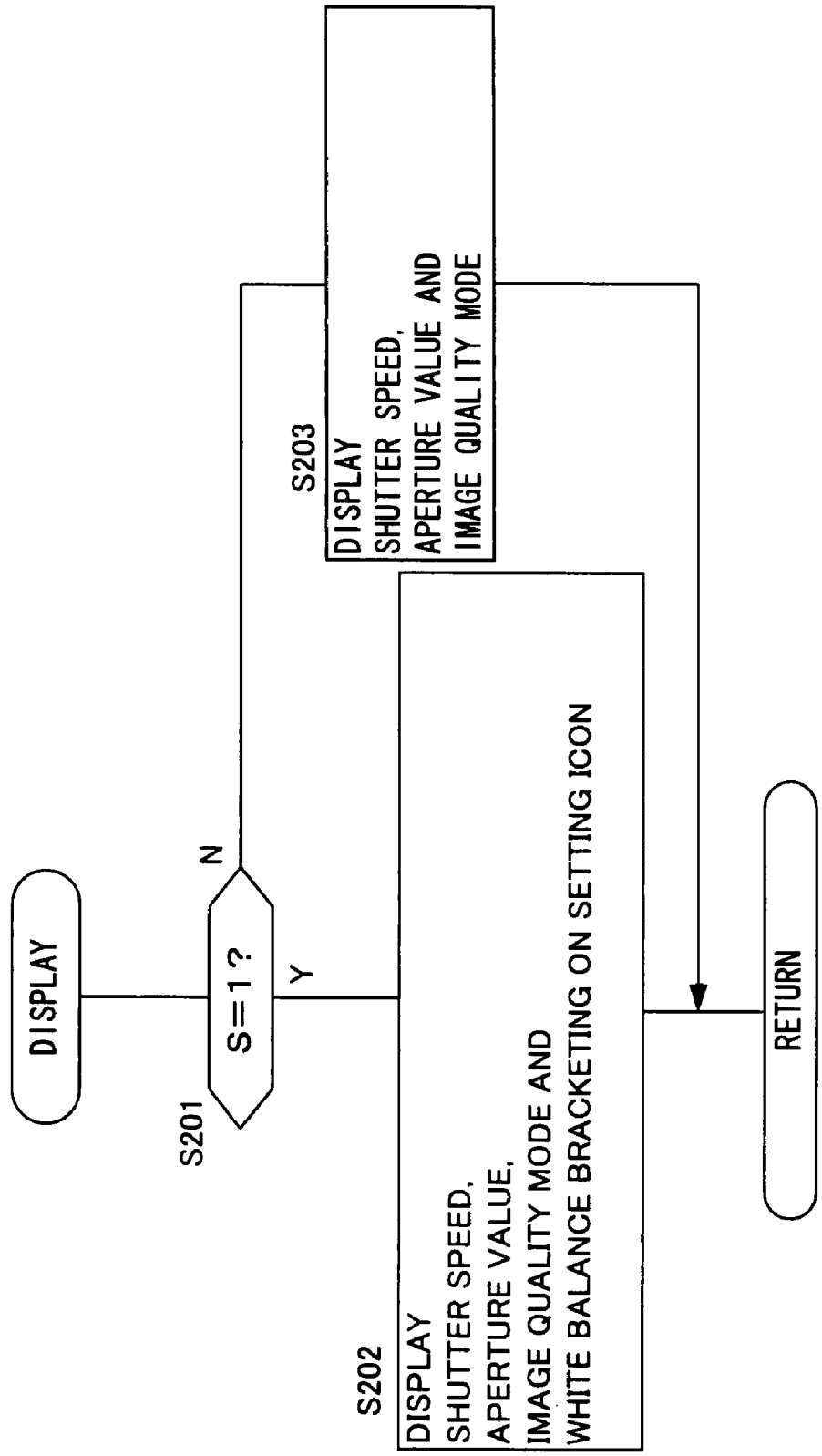
FIG. 5 presents a flowchart of the display processing.

The display processing is now explained in detail in reference to the flowchart presented in FIG. 5. In step S201, the arithmetic operation circuit 101 makes a decision as to whether or not the WB bracketing flag S is set to 1. The arithmetic operation circuit 101 makes an affirmative decision in step S201 if S=1 (WB bracketing is currently set) to proceed to step S202, whereas it makes a, negative decision in step S201 if S=0 (WB bracketing has been cleared) to proceed to step S203.

In step S202, the arithmetic operation circuit 101 engages the display device 112 to display values indicating the shutter speed and the aperture value, an icon indicating the image quality mode (image recording quality), an icon indicating that WB bracketing is on and the like, before the processing shown in FIG. 5 ends and the operation proceeds to step S6 in FIG. 2. In step S203, the arithmetic operation circuit 101 engages the display device 112 to display the values indicating the shutter speed and the aperture value, and an icon indicating the image quality mode (image recording quality), before the processing shown in FIG. 5 ends and the operation proceeds to step S6 in FIG. 2.

The following advantages are achieved in the electronic camera according to the first embodiment described above.
(1) If the image recording quality 1, i.e., "RAW", is selected (if an affirmative decision is made in step S106) while the WB bracketing is currently set at the electronic camera (when an affirmative decision is made in step S105), the WB bracketing is cleared (step S107). As a result, the operation during which the image processing is executed (WB bracketing) or the operation during which no image processing is executed (the image recording quality 1 "RAW") is selectively performed and thus, a conflict of the two operations does not occur. Consequently, the image data before the image processing and the plurality of sets of image data obtained by executing the image processing through the WB bracketing are not recorded into the recording medium 126 together, to ensure that the recording medium 126 does not become used up quickly.
(2) Since the operation for setting and clearing the WB bracketing is prohibited (the processing shown in FIG. 4 ends) if the image recording quality 1 "RAW" is currently set at the electronic camera (if an affirmative decision is made in step S111), a conflict of the operation during which the image processing is executed (WB bracketing) and the operation during which no image processing is executed (the image recording quality 1 "RAW") does not occur. As a result, it is ensured that the image data before the image processing and the image data after the image processing are not both recorded into the recording medium 126, and the recording medium 126 does not become used up quickly.

Second Embodiment

Figure 6:
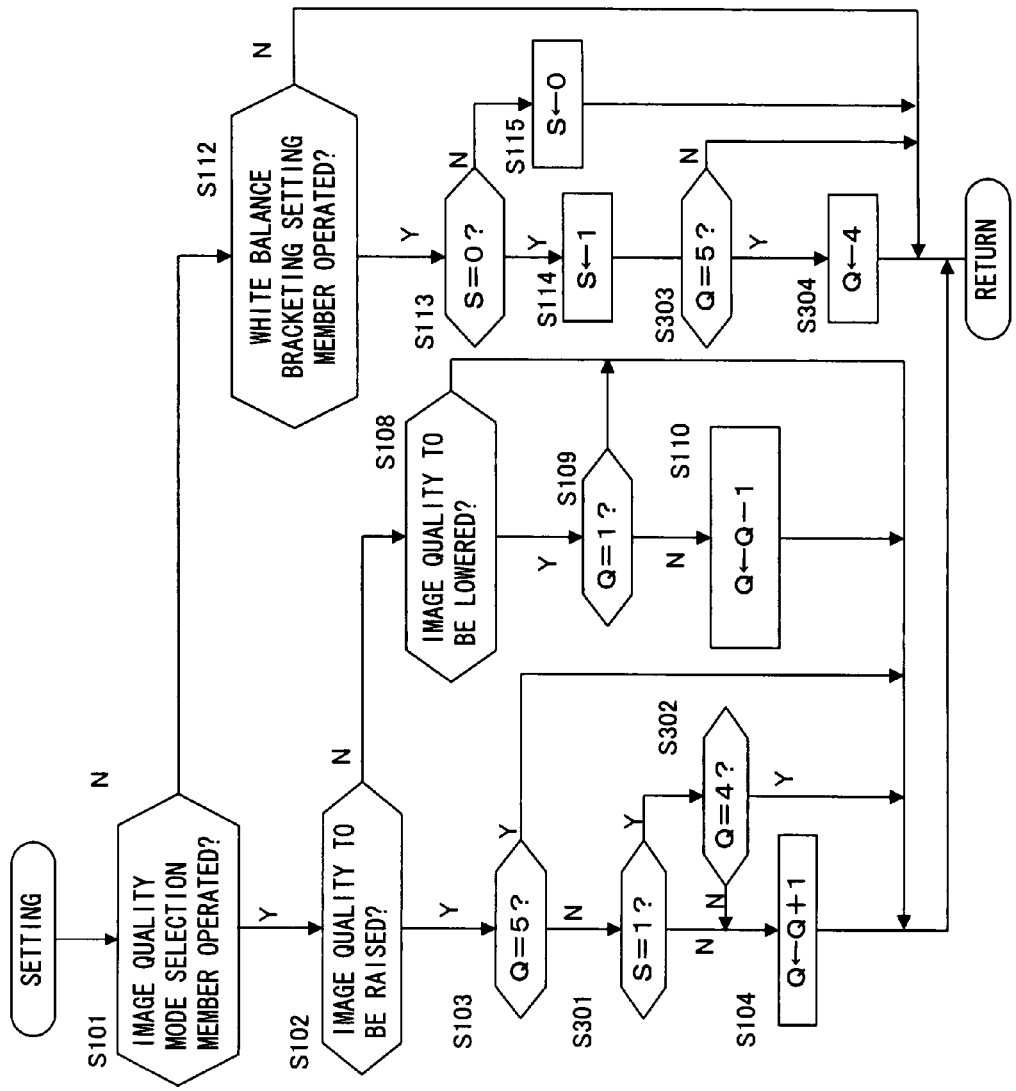
FIG. 6 presents a flowchart of the setting processing executed in a second embodiment.

In the electronic camera according to the second embodiment, (1) the image recording quality is switched from the image recording quality 1 "RAW" to the image recording quality 2 "TIFF" if the WB bracketing is set while the current image recording quality at the electronic camera is the image recording quality 1, i.e., "RAW" and (2) the selection of the image recording quality 1 "RAW" is prohibited while WB bracketing is set at the electronic camera. FIG. 6 presents a detailed flowchart of the setting processing executed in the second embodiment in place of the processing executed in the first embodiment, as shown in FIG. 4.

The processing shown in FIG. 6 differs from that shown in FIG. 4 in that additional steps S301 and S302 are executed between step S103 and step S104 and also in that additional steps S303 and S304 are executed following step S114. In addition, steps S105-S107 and step S111 in the processing shown in FIG. 4 are eliminated. It is to be noted that the same step numbers are assigned to steps in which processing identical to that shown in FIG. 4 is executed to preclude the necessity for a repeated explanation thereof.

In step S301, the arithmetic operation circuit 101 makes a decision as to whether or not the WB bracketing flag S is set to 1. The arithmetic operation circuit 101 makes an affirmative decision in step S301 if S=1 (WB bracketing is currently set) to proceed to step S302, whereas it makes a negative decision in step S301 if S=0 (WB bracketing has been cleared) to proceed to step S104.

In step S302, the arithmetic operation circuit 101 makes a decision as to whether or not the image quality mode parameter Q is set to 4. The arithmetic operation circuit 101 makes an affirmative decision in step S302 if Q=4 (the image recording quality is set to TIFF) to end the processing shown in FIG. 6 and proceed to step S3 in FIG. 2. As a result, if the WB bracketing is set at the electronic camera, an operation for switching from the image recording quality 2, i.e., "TIFF" to the image recording quality 1, i.e., "RAW" is disabled. If, on the other hand, Q□4, the arithmetic operation circuit 101 makes a negative decision in step S302 to proceed to step S104. In this case, the image recording quality is raised by one stage.

In step S303, to which the operation proceeds after setting WB bracketing in step S114, the arithmetic operation circuit 101 makes a decision as to whether or not the image quality mode parameter Q is set to 5. The arithmetic operation circuit 101 makes an affirmative decision in step S303 if Q=5 (the image recording quality is set to RAW) to proceed to step S304, whereas it makes a negative decision in step S303 if Q□5 to end the processing shown in FIG. 6 and proceed to step S3 in FIG. 2. In step S304, the arithmetic operation circuit 101 selects the image recording quality 2, i.e., "TIFF", and also sets 4 for the value of Q before the processing shown in FIG. 6 ends and the operation proceeds to step S3 in FIG. 2. Thus, if the WB bracketing is set when the current image recording quality set at the electronic camera is the image recording quality 1 "RAW", the image recording quality 1 "RAW" is automatically switched to the image recording quality 2 "TIFF".

The following advantages are achieved in the second embodiment explained above.
(1) If the WB bracketing is set at the electronic camera (step S114) when the current image recording quality setting is the image recording quality 1 "RAW" (when an affirmative decision is made in step S303), the image recording quality 1 "RAW" is switched to the image recording quality 2 "TIFF" (step S304). Thus, either the operation during which the image processing is executed (WB bracketing) or the operation during which no image processing is executed (the image recording quality 1 "RAW") is selectively performed, thereby preventing a conflict of these operations. As a result, it is ensured that the image data before the image processing and the image data after the image processing are not recorded into the recording medium 126 together and the recording medium 126 does not become used up quickly, as in the first embodiment.

(2) Since the operation for switching from the image recording quality 2 "TIFF" to the image recording quality 1 "RAW" is prohibited (an affirmative decision is made in step S302 and the processing shown in FIG. 6 ends) while the WB bracketing is set at the electronic camera (when an affirmative decision is made in step S301), a conflict of the operation during which the image processing is executed (WB bracketing) and the operation during which no image processing is executed (the image recording quality 1 "RAW") is avoided. As a result, it is ensured that the image data before the image processing and the image data after the image processing are not recorded into the recording medium 126 together and the recording medium 126 does not become used up quickly, as in the first embodiment.

Third Embodiment

Figure 7:
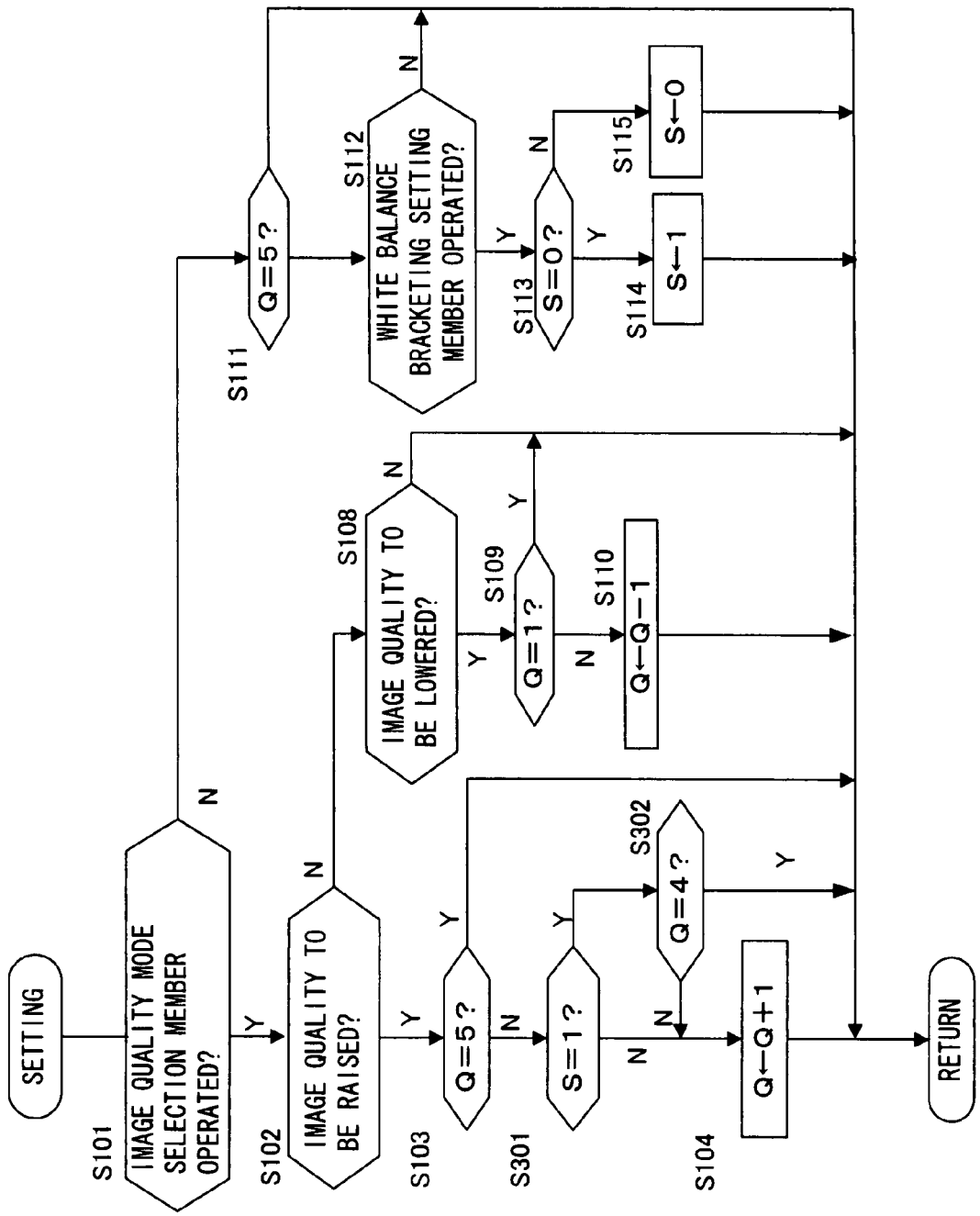
FIG. 7 presents a flowchart of the setting processing executed in a third embodiment.

In the electronic camera according to the third embodiment, (1) the selection of the image recording quality 1, i.e., "RAW", is prohibited while the WB bracketing is set at the electronic camera and (2) an operation for setting and clearing the WB bracketing is prohibited when the current image recording quality set at the electronic camera is the image recording quality 1 "RAW". FIG. 7 presents a detailed flowchart of the setting processing executed in the third embodiment in place of the processing executed in the first embodiment, as shown in FIG. 4.

The processing shown in FIG. 7 differs from that shown in FIG. 4 in that additional steps S301 and S302 are executed between step S103 and step S104 and that steps S105-S107 are eliminated. Processing identical to that executed in the additional steps in the second embodiment, as shown in FIG. 6, is executed in step S301 and step S302. It is to be noted that the same step numbers are assigned to steps in which processing identical to that shown in FIG. 4 is executed to preclude the necessity for a repeated explanation thereof.

In the third embodiment described above, the operation for switching from the image recording quality 2, i.e., "TIFF", to the image recording quality 1, i.e., "RAW", is prohibited (an affirmative decision is made in step S302 and the processing shown in FIG. 7 ends) if the WB bracketing is set at the electronic camera (if an affirmative decision is made in step S301), whereas the operation for setting and clearing the WB bracketing is prohibited (the processing shown in FIG. 7 ends) if the current image recording quality set at the electronic camera is the image recording quality 1 "RAW" (if an affirmative decision is made in step S111). Thus, either the operation during which the image processing is executed (WB bracketing) or the processing during which no image processing is executed (the image recording quality 1 "RAW") is selectively performed, thereby preventing a conflict of these operations. Consequently, since the image data before the image processing and the image data after the image processing are not recorded into the recording medium 126 together, the recording medium 126 does not become used up quickly, as in the first embodiment. Furthermore, since the setting is not changed from the image recording quality 1 "RAW" to the image recording quality 2 "TIFF" or from the WB bracketing ON to WB bracketing OFF until the photographer performs a setting change, no change in settings that does not reflect the photographer's wishes occurs.

Fourth Embodiment

Figure 8:
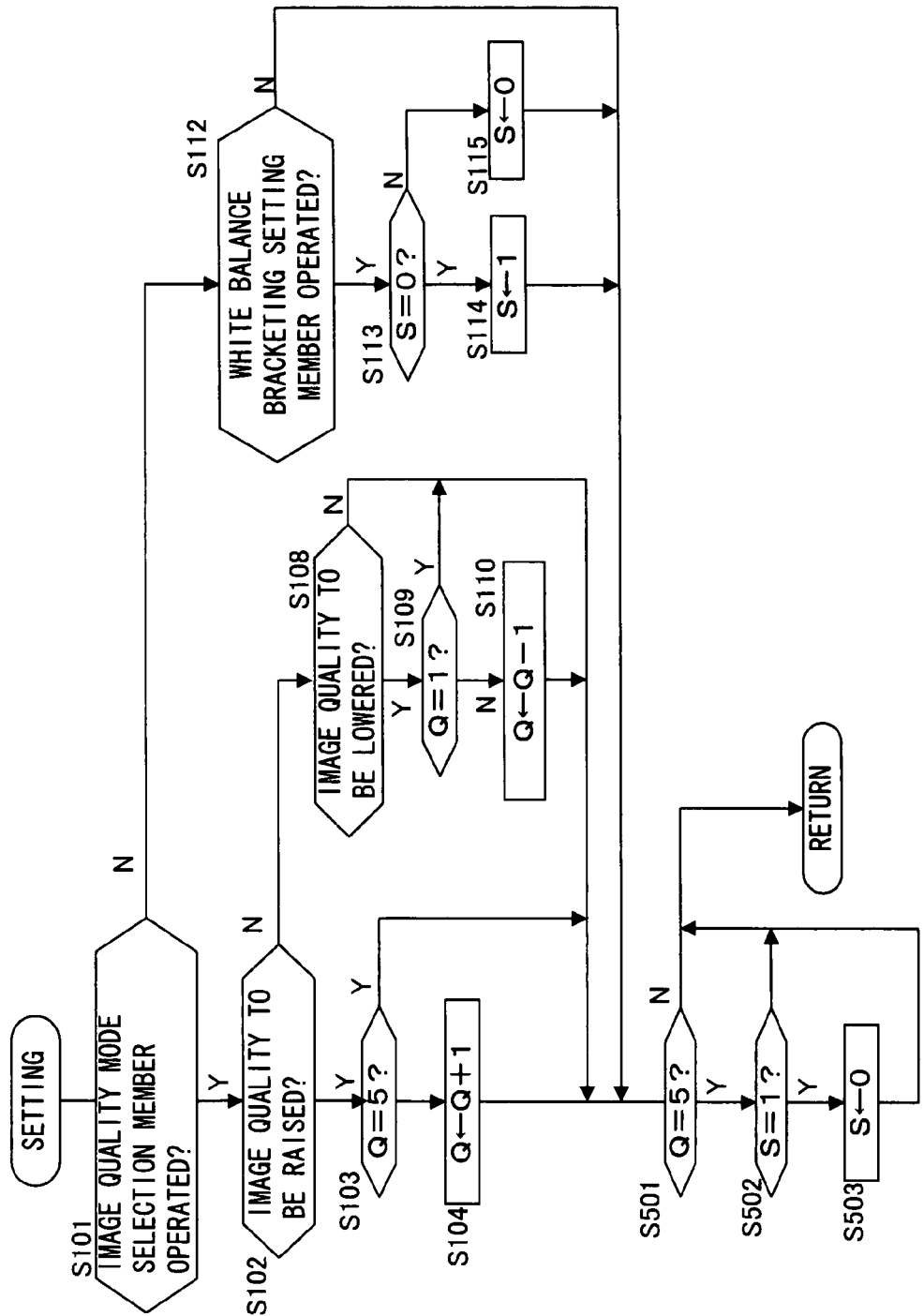
FIG. 8 presents a flowchart of the setting processing executed in a fourth embodiment.

In the electronic camera according to the fourth embodiment, (1) the selection of the WB bracketing is prohibited if the current image recording quality set at the electronic camera is the image recording quality 1, i.e., "RAW" and (2) the WB bracketing is cleared if the image recording quality 1 "RAW" is selected while the WB bracketing is set for the electronic camera. FIG. 8 presents a detailed flowchart of the setting processing executed in the fourth embodiment in place of the processing executed in the first embodiment, as shown in FIG. 4.

The processing shown in FIG. 8 differs from that shown in FIG. 4 in that steps S501-S503 are executed instead of steps S105-S107 and in that step S111 is eliminated. The operation proceeds to step S501 after ending the processing in step S114 or step S115. It is to be noted that the same step numbers are assigned to steps in which processing identical to that shown in FIG. 4 is executed to preclude the necessity for a repeated explanation thereof.

In step S501, the arithmetic operation circuit 101 makes a decision as to whether or not the image quality mode parameter Q is set to 5. The arithmetic operation circuit 101 makes an affirmative decision in step S501 if Q=5 (the image recording quality is set to RAW) to proceed to step S502, whereas it makes a negative decision in step S501 if Q☐5 to end the processing shown in FIG. 8 and proceed to step S3 in FIG. 2.

In step S502, the arithmetic operation circuit 101 makes a decision as to whether or not the WB bracketing flag S is set to 1. The arithmetic operation circuit 101 makes an affirmative decision in step S502 if S=1<(WB bracketing is currently set) to proceed to step S503, whereas it makes a negative decision in step S502 if S=0 (WB bracketing has been cleared) to end the processing shown in FIG. 8 and proceed to step S3 in FIG. 2.

In step S503, the arithmetic operation circuit 101 clears the WB bracketing and also sets 0 for the WB bracketing flag before the processing shown in FIG. 8 ends and the operation proceeds to step S3 in FIG. 2. Thus, if the photographer attempts to set both the image recording quality 1 "RAW" and the WB bracketing for the electronic camera, the WB bracketing is automatically cleared.

The following advantages are achieved in the electronic camera in the fourth embodiment described above.

(1) The WB bracketing set at the electronic camera (step S114) is invalidated (step S503) if the current image recording quality setting is the image recording quality 1 "RAW" (if an affirmative decision is made in step S501), and thus, a conflict of the operation during which the image processing is executed (WB bracketing) and the operation during which no image processing is executed (the image recording quality 1 "RAW") is prevented. As a result, the image data before the image processing and the image data after the image processing are not recorded into the recording medium 126 together and the recording medium 126 does not become used up quickly, as in the first embodiment.

(2) If the WB bracketing is set (if an affirmative decision is made in step S502) when the current image recording quality set at the electronic camera is the image recording quality 1 "RAW" (an affirmative decision is made in step S501), the WB bracketing is cleared up (step S503). Thus, the operation during which the image processing is executed (WB bracketing) or the operation during which no image processing is executed (the image recording quality 1 "RAW") is selectively performed, thereby preventing a conflict of these operations. As a result, the image data before the image processing and the image data after the image processing are not recorded into the recording medium 126 together and the image recording medium 126 does not become used up quickly, as in the first embodiment.

Fifth Embodiment

In the electronic camera according to the fifth embodiment, (1) the selection of the image recording quality 1, i.e., "RAW", is prohibited if the WB bracketing is currently set at the electronic camera and (2) a switch is made from the image recording quality 1 "RAW" to the image recording quality 2 "TIFF" if the WB bracketing is set at the electronic camera while the current image recording quality setting at the electronic camera is the image recording quality 1 "RAW".

Figure 9:
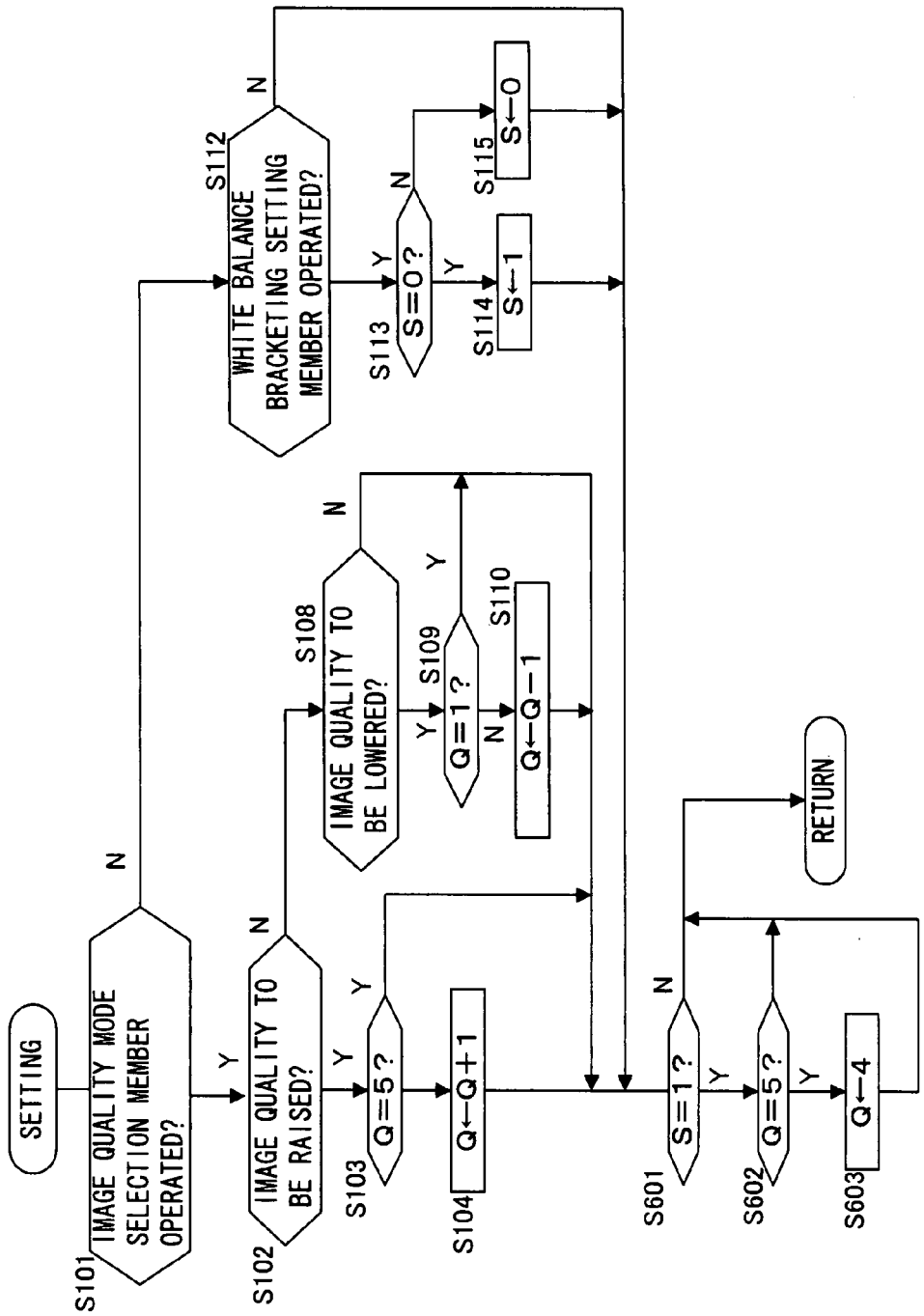
FIG. 9 presents a flowchart of the setting processing executed in a fifth embodiment.

FIG. 9 presents a detailed flowchart of the setting processing executed in the fifth embodiment in place of the processing executed in the first embodiment, as shown in FIG. 4.

The processing shown in FIG. 9 differs from that shown in FIG. 4 in that steps S601-S603 are executed instead of steps S105-S107 and in that step S111 is eliminated. The operation proceeds to step S601 after ending the processing in step S114 or step S115. It is to be noted that the same step numbers are assigned to steps in which processing identical to that shown in FIG. 4 is executed to preclude the necessity for a repeated explanation thereof.

In step S601, the arithmetic operation circuit 101 makes a decision as to whether or not the WB bracketing flag S is set to 1. The arithmetic operation circuit 101 makes an affirmative decision in step S601 if S=1 (WB bracketing is currently set) to proceed to step S602, whereas it makes a negative decision in step S601 if S=0 (WB bracketing has been cleared) to end the processing shown in FIG. 9 and proceed to step S3 in FIG. 2.

In step S602, the arithmetic operation circuit 101 makes a decision as to whether or not the image quality mode parameter Q is set to 5. The arithmetic operation circuit 101 makes an affirmative decision in step S602 if Q=5 (the image recording quality is set to RAW) to proceed to step S603, whereas it makes a negative decision in step S602 if Q☐5 to end the processing shown in FIG. 9 and proceed to step S3 in FIG. 2.

In step S603, the arithmetic operation circuit 101 sets the image recording quality 2, i.e., "TIFF", and also sets 4 for the value of Q before the processing shown in FIG. 9 ends and the operation proceeds to step S3 in FIG. 2. Thus, if the photographer attempts to set both the image recording quality 1 "RAW" and the WB bracketing for the electronic camera, an automatic switch is made from the image recording quality 1 "RAW" to the image recording quality 2 "TIFF".

The following advantages are achieved in the electronic camera in the fifth embodiment described above. The image recording quality setting 1 "RAW" set for the electronic camera (an affirmative decision is made in step S103) is invalidated (step S603) if the WB bracketing is set at the electronic camera (if an affirmative decision is made in step S601) and, as a result, a conflict of the operation during which the image processing is executed (WB bracketing) and the operation during which no image processing is executed (the image recording quality 1 "RAW") is prevented. Consequently, the image data before the image processing and the image data after the image processing are not recorded into the recording medium 126 together and the recording medium 126 does not become used up quickly, as in the first embodiment.

(2) If the WB bracketing is selected for the electronic camera (step S114) when the current image recording quality set at the electronic camera is the image recording quality 1 "RAW", (if an affirmative decision is made in step S602), the image recording quality 1 "RAW" is switched to the image recording quality 2 "TIFF" (step S603), and thus, either the operation during which the image processing is executed (WB bracketing) or the operation during which no image processing is executed (the image recording quality 1 "RAW") is selectively performed to prevent a conflict of these operations. Consequently, the image data before the image processing and the image data after the image processing are not recorded into the recording medium 126 together and the recording medium 126 does not become used up quickly, as in the first embodiment.

Sixth Embodiment

Figure 10:
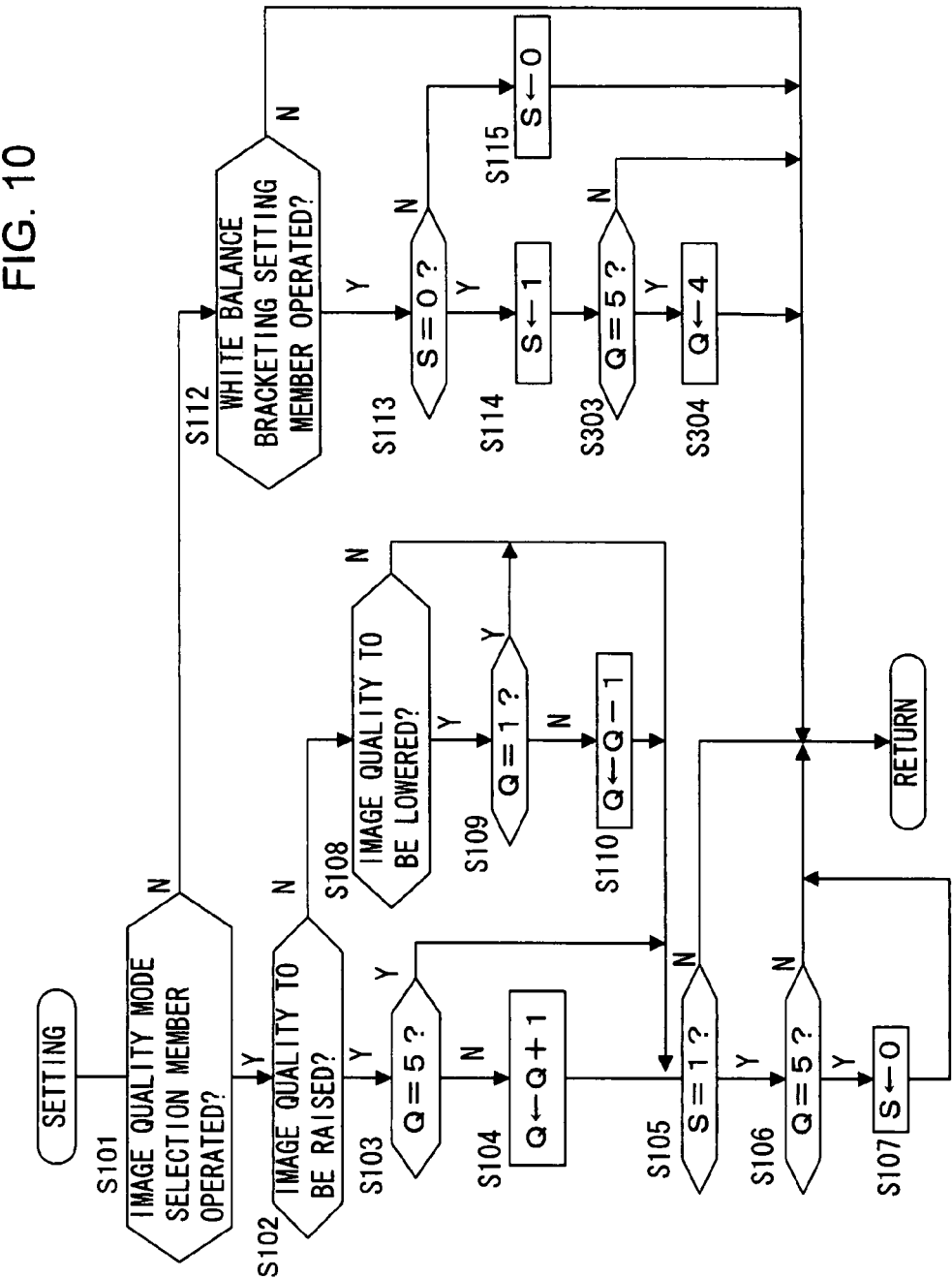
FIG. 10 presents a flowchart of the setting processing executed in a sixth embodiment.

FIG. 10 presents a flowchart of a variation of the setting processing executed in the first embodiment described earlier. The same step numbers are assigned to steps in which processing identical to that shown in FIG. 4 is executed to preclude the necessity for a repeated explanation thereof. An explanation of step S303 and step S304 is also omitted, since processing identical to that executed in steps S303 and S304 in FIG. 6 is executed in these steps.

In the processing executed in the sixth embodiment, if an operation for setting the WB bracketing for the electronic camera and an operation for setting the image recording quality 1 "RAW" are both performed, priority is given to the more recent setting operation and the setting selected earlier is cleared. Namely, (1) if the image recording quality 1 "RAW" is selected (if an affirmative decision is made in step S106) in the electronic camera already set for WB bracketing (an affirmative decision is made in step S105), the WB bracketing is cleared (step S107), and (2) if the image recording quality 1 "RAW" is already set (if an affirmative decision is made in step S303) at the electronic camera when an operation for setting the WB bracketing is performed (step S114), the image recording quality 1 "RAW" is switched to the image recording quality 2 "TIFF" (step S304). Thus, as in the first embodiment, a conflict of the operation during which the image processing is executed (WB bracketing) and the operation during which no image processing is executed (the image recording quality 1 "RAW") is prevented.

Through the processing in steps S303 and S304 in FIG. 10, the setting is switched from the image recording quality 1 "RAW" to the image recording quality 2 "TIFF". Instead, the setting may be switched from the image recording quality 1 "RAW" to the image recording quality 3 "FINE", the image recording quality 4 "NORMAL" or the image recording quality 5 "BASIC". This principle applies to the processing executed in steps S303 and S304 in FIG. 6 and the processing in steps S602 and S603 in FIG. 9.

Seventh Embodiment

Figure 11:
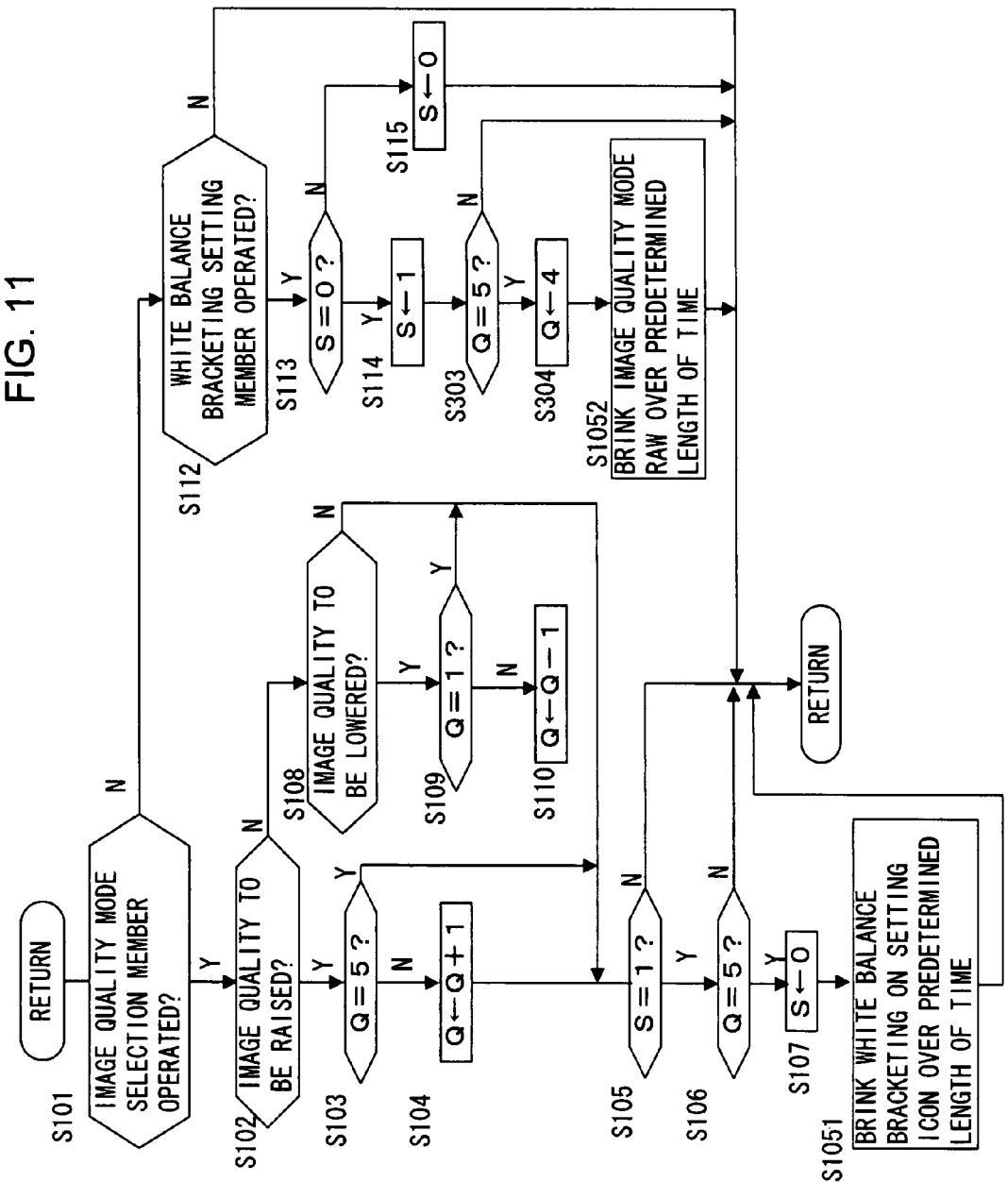
FIG. 11 presents a flowchart of the setting processing executed in a seventh embodiment.

When clearing the setting having been selected earlier in the sixth embodiment, the display segment corresponding to the setting to be cleared may be made to blink. FIG. 11 presents a flowchart of a variation of the setting processing shown in FIG. 10. It differs from the processing shown in FIG. 10 in that additional steps S1051 and S1052 are executed and, accordingly, the following explanation focuses on the difference.

In step S1051 to which the operation proceeds after step S107, the arithmetic operation circuit 101 engages the display device 112 to blink the display segment such as an icon indicating the WB bracketing ON setting over a predetermined length of time and then to turn off the display when the predetermined length of time elapses. The predetermined length of time is set in advance to 10 seconds or less, for instance, so as to ensure that the photographer does not miss the blinking display. Once the processing in step S1051 is completed, the arithmetic operation circuit 101 ends the processing shown in FIG. 11.

In step S1052, to which the operation proceeds after step S304, the arithmetic operation circuit 101 engages the display device 112 to blink the display segment such as an icon indicating the image recording quality 1 "RAW" over a predetermined length of time and then to turn on the display segment such as an icon indicating the image recording quality 2 "TIFF" when the blinking display ends. The arithmetic operation circuit 101 ends the processing shown in FIG. 11 once the processing in step S1052 is completed. It is to be noted that the display segment which is set in a steady ON state after the blinking display ends in step S1052 corresponds to the image recording quality to which the switch is made from the image recording quality 1 "RAW".

In the processing executed in the seventh embodiment, when clearing the setting for either the WB bracketing or the image recording quality 1 "RAW" that has been selected earlier, the display segment corresponding to the setting to be cleared blinks over a predetermined length of time (step S1051, step S1052). Thus, a warning is provided to alert the photographer to the setting change.

Eighth Embodiment

Figure 12:
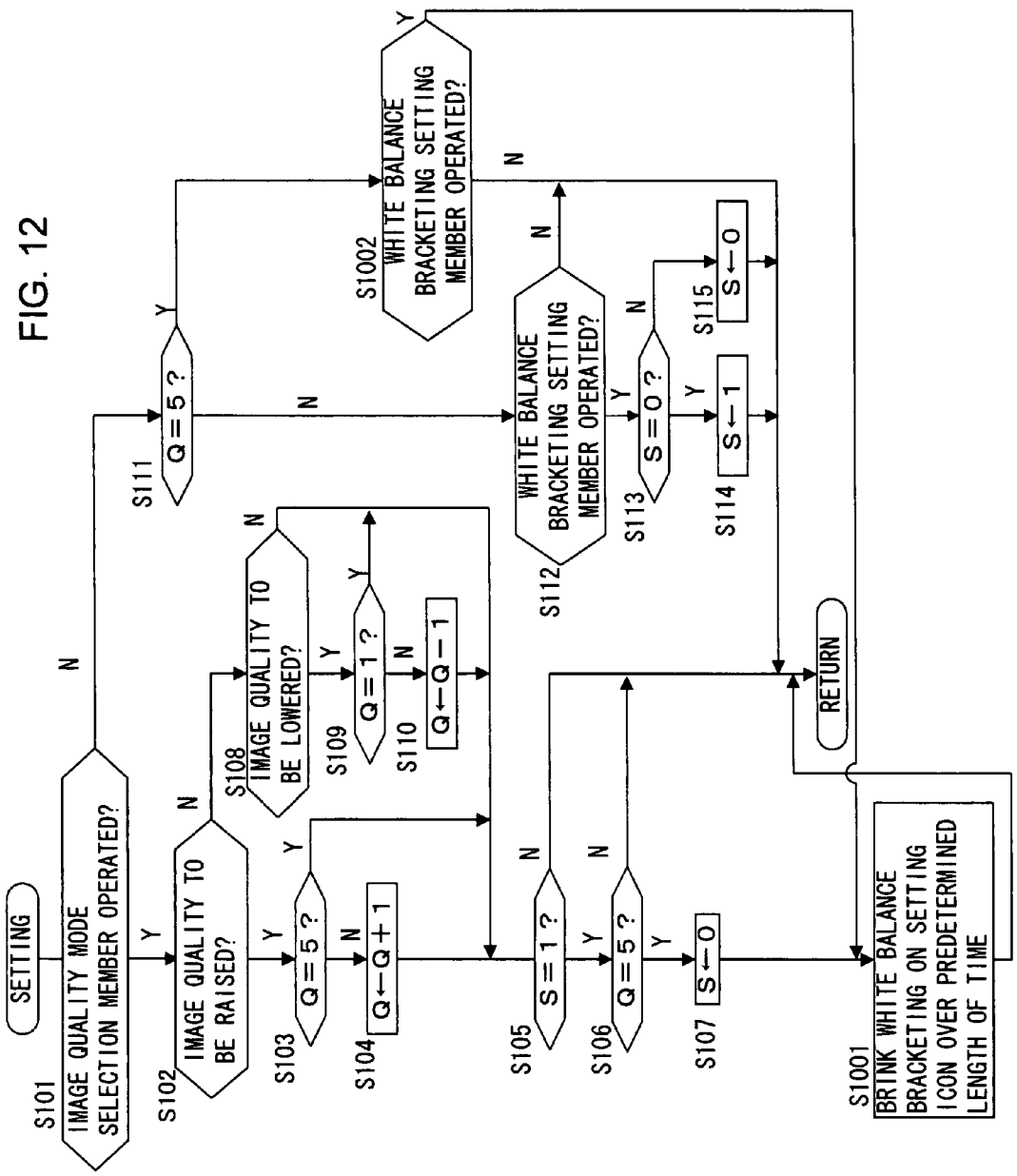
FIG. 12 presents a flowchart of the setting processing executed in an eighth embodiment.

When the setting for the WB bracketing having been selected earlier is cleared or the operation for setting and clearing the WB bracketing is prohibited in the first embodiment, the display segment that indicates the WB bracketing ON setting may be made to blink. FIG. 12 presents a flowchart of a variation of the setting processing shown in FIG. 4. It differs from the processing shown in FIG. 4 in that additional steps S1001 and S1002 are executed and, accordingly, the following explanation focuses on the difference.

In step S1001 to which the operation proceeds after step S107, the arithmetic operation circuit 101 engages the display device 112 to blink the display segment such as an icon indicating the WB bracketing ON setting over a predetermined length of time and then to turn off the display when the predetermined length of time elapses. Once the processing in step S1001 is completed, the arithmetic operation circuit 101 ends the processing shown in FIG. 12.

In step S1002, to which the operation proceeds after making an affirmative decision in step S111, the arithmetic operation circuit 101 makes a decision as to whether or not the WB bracketing setting operation member 113 has been operated. The arithmetic operation circuit 101 makes an affirmative decision in step S1002 if an operation signal has been input from the WB bracketing setting operation member 113 to proceed to step S1001, whereas it makes a negative decision in step S1002 if no operation signal has been input to end the processing shown in FIG. 12.

In the processing executed in the eighth embodiment, if the image recording quality 1 "RAW" is selected (if an affirmative decision is made in step S106) in the electronic camera already set for the WB bracketing (an affirmative decision is made in step S105), the WB bracketing is cleared (step S107). At this time, the display segment such as an icon indicating the WB bracketing ON setting blinks over the predetermined length of time (step S1001). In addition, the operation for setting and clearing the WB bracketing is prohibited (the processing shown in FIG. 12 ends) when the current image recording quality set at the electronic camera is the image recording quality 1 "RAW" (when an affirmative decision is made in step S111). In this situation, too, the display segment such as an icon indicating the WB bracketing ON setting is made to blink over the predetermined length of time (step S1001). As a result, a warning is provided to alert the photographer to a setting change or to notify the photographer that an operation for changing the setting status is prohibited.

Ninth Embodiment

Figure 13:
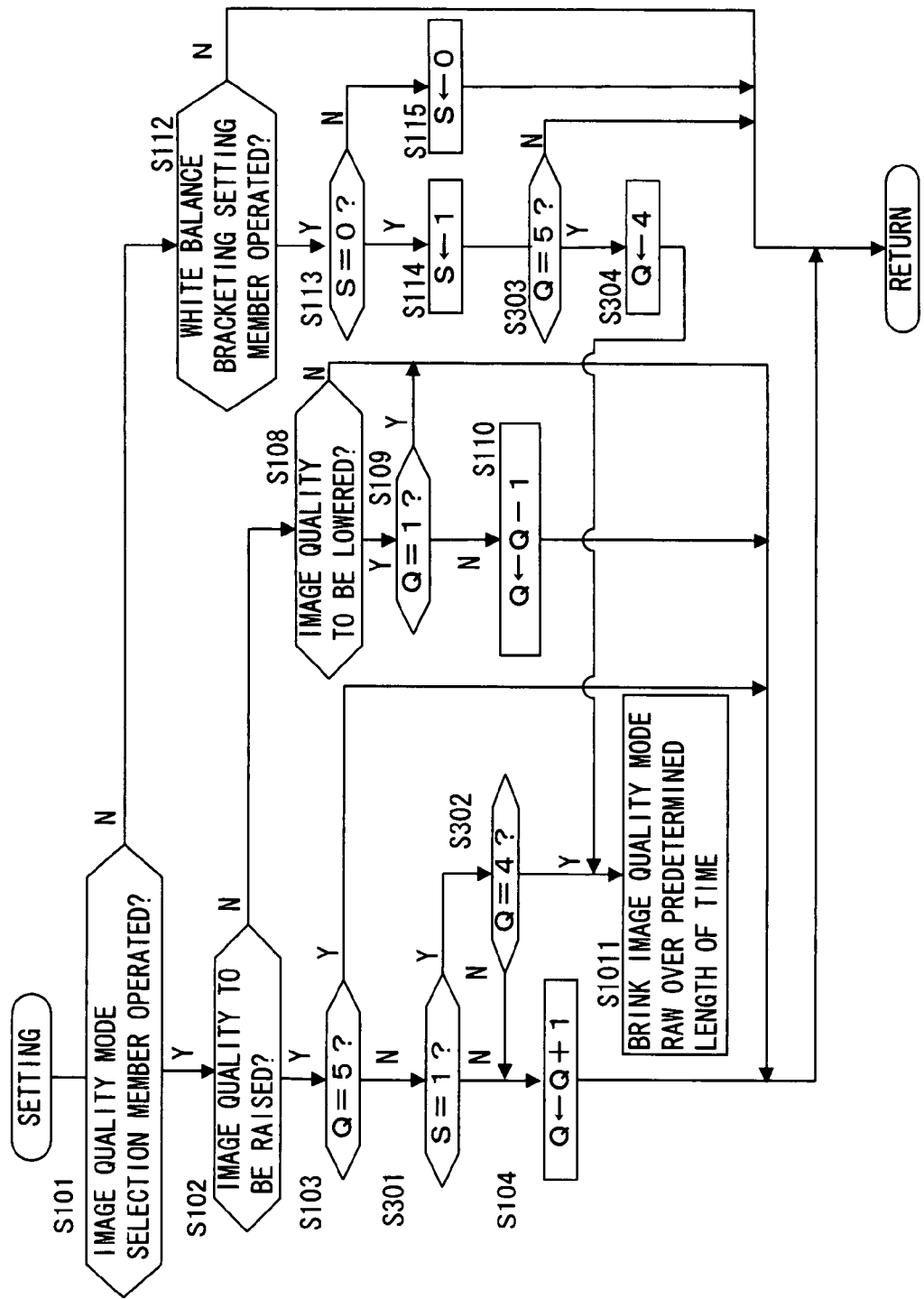
FIG. 13 presents a flowchart of the setting processing executed in a ninth embodiment.

When the setting is switched from the currently selected image recording quality 1 "RAW" to the image recording quality 2 "TIFF" or the setting change to the image recording quality 1 "RAW" is prohibited in the second embodiment, the display segment indicating the image recording quality may be made to blink. FIG. 13 presents a flowchart of a variation of the setting processing shown in FIG. 6. It differs from the processing shown in FIG. 6 in that an additional step S1011 is executed and, accordingly, the following explanation focuses on the difference.

After making an affirmative decision in step S302, the operation proceeds to step S1011, in which the arithmetic operation circuit 101 engages the display device 112 to blink the display segment such as an icon indicating the image recording quality 1 "RAW" over a predetermined length of time and then to turn on the display segment such as an icon indicating the image recording quality 2 "TIFF" when the blinking display ends. The arithmetic operation circuit 101 ends the processing shown in FIG. 13 once the processing in step S1011 is completed. It is to be noted that the display segment which is set in a steady ON state after the blinking display ends in step S1011 corresponds to the image recording quality that is actually selected.

The arithmetic operation circuit 101 also proceeds to step S1011 after ending the processing in step S304.

In the processing executed in the ninth embodiment, if the WB bracketing is set (step S114) for the electronic camera at which the image recording quality 1 "RAW" is currently set (an affirmative decision is made in step S303), the setting is switched from the image recording quality 1 "RAW" to the image recording quality 2 "TIFF" (step S304). At this time, the display segment such as an icon indicating the image recording quality 1 "RAW" is made to blink at the display device 112 over the predetermined length of time (step S1011). In addition, if the WB bracketing is currently set at the electronic camera (if an affirmative decision is made in step S301), the operation for switching the image quality setting to the image recording quality 1 "RAW" is prohibited (an affirmative decision is made in step S302). In this situation, too, the display segment such as an icon indicating the image recording quality 1 "RAW" is made it to blink over the predetermined lens of time (step S1011). As a result, a warning is provided to alert the photographer to the setting change or to notify the photographer that an operation for switching the setting is prohibited.

Tenth Embodiment

Figure 14:
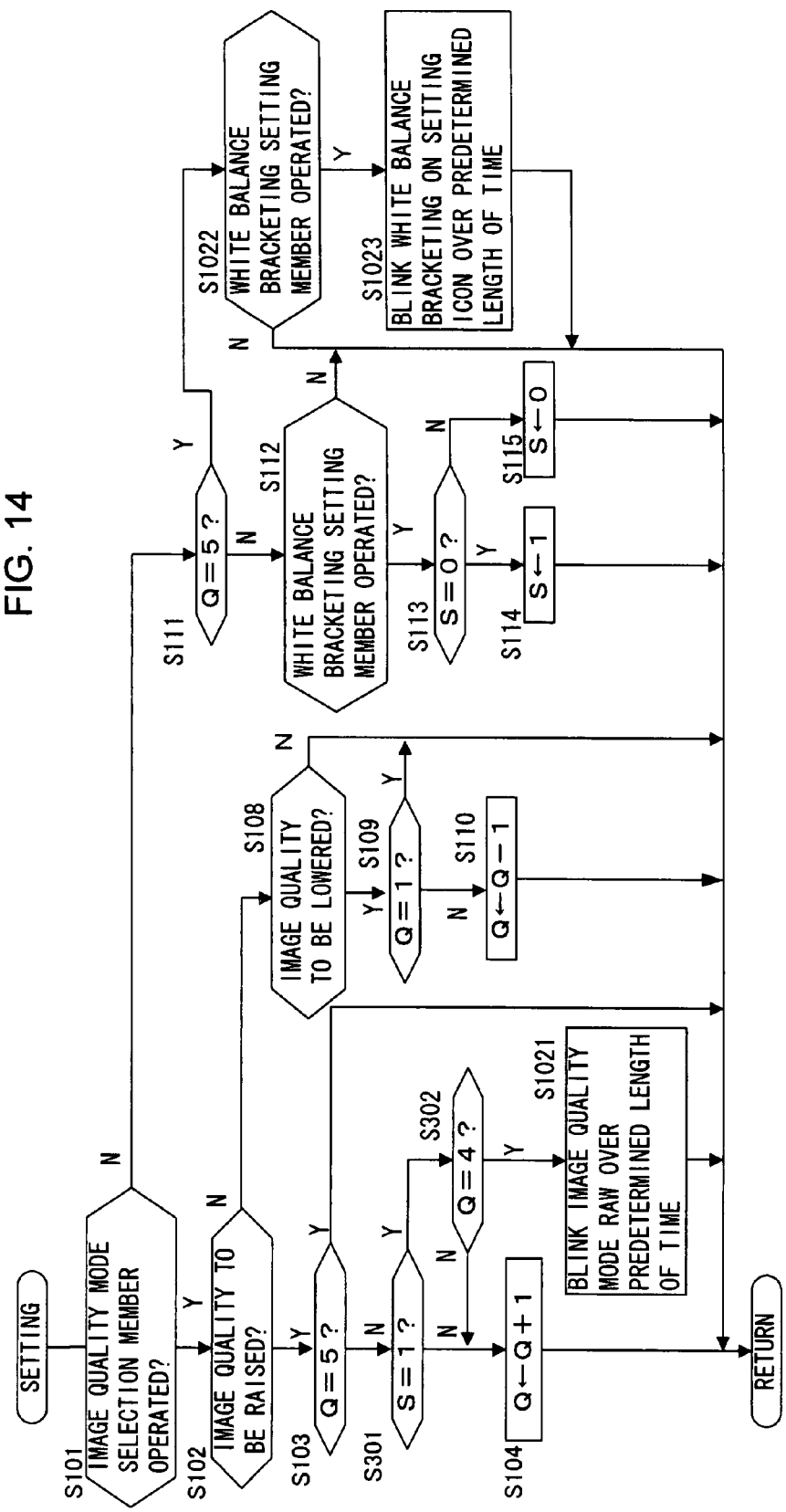
FIG. 14 presents a flowchart of the setting processing executed in a tenth embodiment.

When prohibiting the operation for switching the image quality setting to the image recording quality 1 "RAW" or the operation for setting and clearing the WB bracketing in the third embodiment, the display segment corresponding to the prohibited operation may be made to blink. FIG. 14 presents a flowchart of a variation of the setting processing shown in FIG. 7. It differs from the processing shown in FIG. 7 in that additional steps S1021-S1023 are executed and, accordingly, the following explanation focuses on the difference.

After making an affirmative decision in step S302, the operation proceeds to step S1021, in which the arithmetic operation circuit 101 engages the display device 112 to blink the display segment such as an icon indicating the image recording quality 1 "RAW" over a predetermined length of time and then to turn on the display segment such as an icon indicating the image recording quality 2 "TIFF" when the blinking display ends. The arithmetic operation circuit 101 ends the processing shown in FIG. 14 once the processing in step S1021 is completed. It is to be noted that the display segment which is set in a steady ON state after the blinking display ends in step S1021 corresponds to the image recording quality that is actually selected.

In step S1022, to which the operation proceeds after making an affirmative decision in step S111, the arithmetic operation circuit 101 makes a decision as to whether or not the WB bracketing setting operation member 113 has been operated. The arithmetic operation circuit 101 makes an affirmative decision in step S1022 if an operation signal has been input from the WB bracketing setting operation member 113 to proceed to step S1023, whereas it makes a negative decision in step S1022 if no operation signal has been input to end the processing shown in FIG. 14.

In step S1023, the arithmetic operation circuit 101 engages the display device 112 to blink the display segment such as an icon indicating the WB bracketing ON setting over a predetermined length of time and then to turn off the display when the predetermined length of time elapses. Once the processing in step S1023 is completed, the arithmetic operation circuit 101 ends the processing shown in FIG. 14.

In the processing executed in the tenth embodiment, the operation for switching the image quality setting to the image recording quality 1 "RAW" is prohibited (an affirmative decision is made in step S302) if the electronic camera is currently set for the WB bracketing (if an affirmative decision is made in step S301). In such a situation, the display segment such as an icon indicating the image recording quality 1 "RAW" is made to blink over the predetermined length of time at the display device 112 (step S1021). In addition, if the current image recording quality set at the electronic camera is the image recording quality 1 "RAW" (if an affirmative decision is made in step S111), the operation for setting and clearing the WB bracketing is prohibited (the processing shown in FIG. 14 ends). In this situation, the display segment such as an icon indicating the WB bracketing ON setting is made to blink over the predetermined length of time (step S1023). As a result, a warning is provided to notify the photographer that an operation for switching the setting is prohibited.

Eleventh Embodiment

Figure 15:
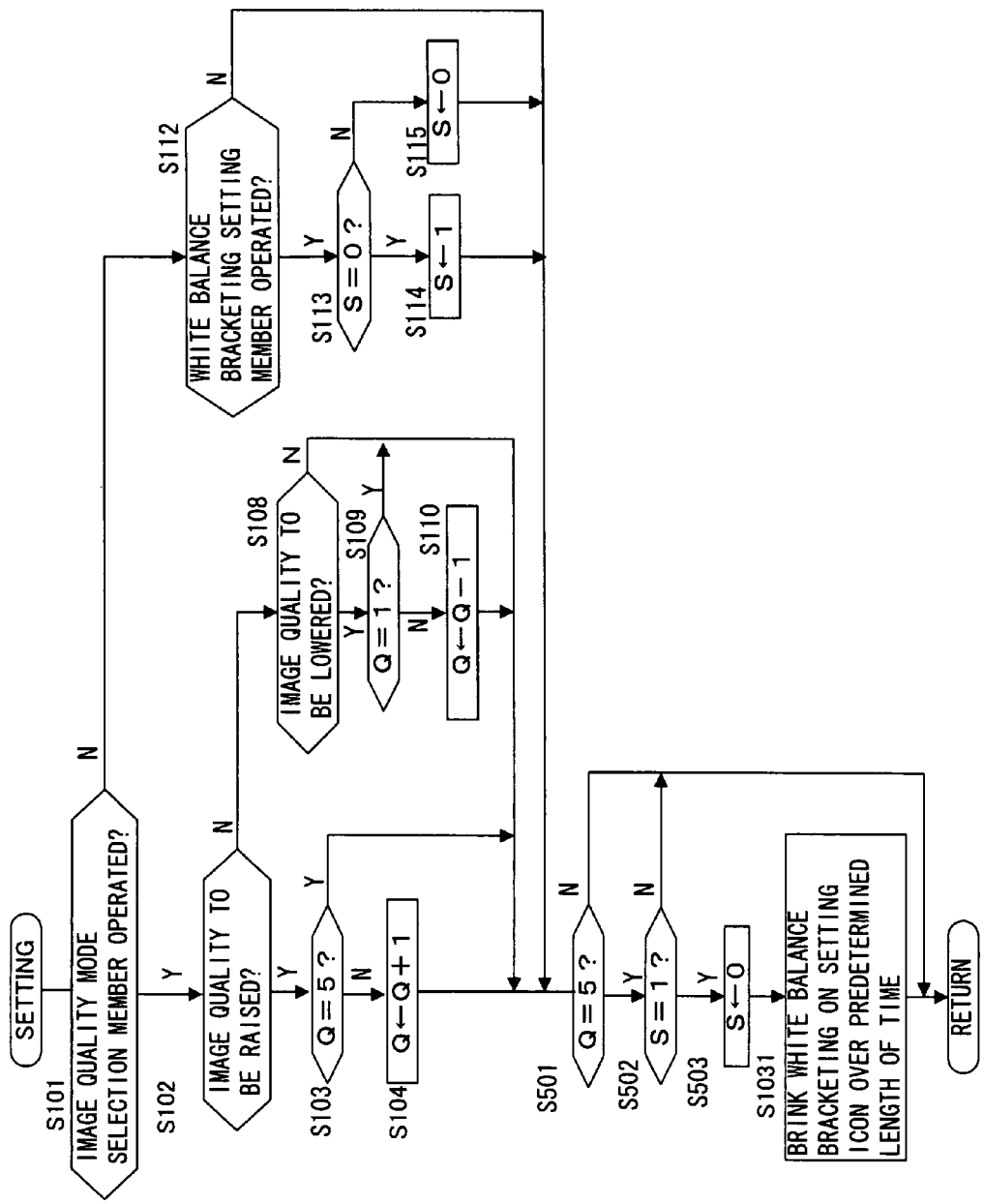
FIG. 15 presents a flowchart of the setting processing executed in an eleventh embodiment.

When the setting for the WB bracketing having been selected earlier is cleared or the operation for setting and clearing the WB bracketing is prohibited in the fourth embodiment, the display segment that indicates the WB bracketing ON setting may be made to blink. FIG. 15 presents a flowchart of a variation of the setting processing shown in FIG. 8. It differs from the processing shown in FIG. 8 in that an additional step S1031 is executed and, accordingly, the following explanation focuses on the difference.

In step S1031 to which the operation proceeds after step S503, the arithmetic operation circuit 101 engages the display device 112 to blink the display segment such as an icon indicating the WB bracketing ON setting over a predetermined length of time and then to turn off the display when the predetermined length of time elapses. Once the processing in step S1031 is completed, the arithmetic operation circuit 101 ends the processing shown in FIG. 14.

In the processing executed in the eleventh embodiment, the WB bracketing ON setting selected (step S114) for the electronic camera at which the image recording quality 1 "RAW" is already set (an affirmative decision is made in step S501) is invalidated (step S503). In this situation the display segment such as an icon indicating the WB bracketing ON setting is made to blink over the predetermined length of time (step S1031). In addition, if the WB bracketing is set (if an affirmative decision is made in step S502) for the electronic camera at which the image recording quality 1 "RAW" is already set (an affirmative decision is made in step S501), the WB bracketing is cleared (step S503). In this case too, the display segment such as an icon indicating the WB bracketing ON setting is made to blink over the predetermined length of time (step S1031). As a result, a warning is provided to alert the photographer that the setting has been cleared.

Twelfth Embodiment

Figure 16:
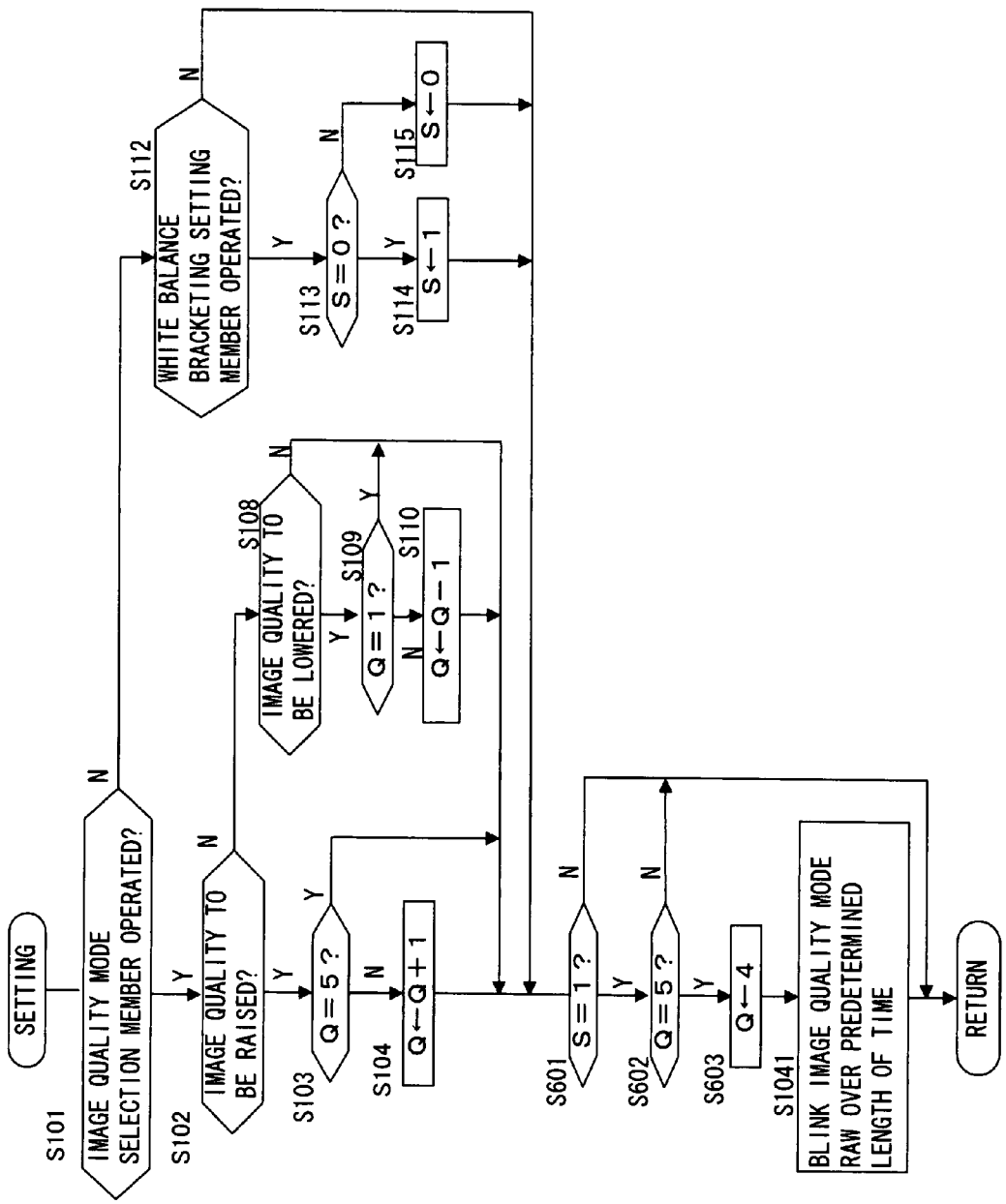
FIG. 16 presents a flowchart of the setting processing executed in a twelfth embodiment.

When the setting is switched from the currently selected image recording quality 1 "RAW" to the image recording quality 2 "TIFF" or an operation for switching to the image recording quality 1 "RAW" is prohibited in the fifth embodiment, the display segment indicating the image recording quality may be made to blink. FIG. 16 presents a flowchart of a variation of the setting processing shown in FIG. 9. It differs from the processing shown in FIG. 9 in that an additional step S1041 is executed and, accordingly, the following explanation focuses on the difference.

In step S1041, to which the operation proceeds after step S603, the arithmetic operation circuit 101 engages the display device 112 to blink the display segment such as an icon indicating the image recording quality 1 "RAW" over a predetermined length of time and then turn on the display segment such as an icon indicating the image recording quality 2 "TIFF" when the blinking display ends. The arithmetic operation circuit 101 ends the processing shown in FIG. 16 once the processing in step S1041 is completed. It is to be noted that the display segment which is set in a steady ON state after the blinking display ends in step S1041 corresponds to the image recording quality that is actually selected.

In the processing executed in the twelfth embodiment, the image recording quality 1 "RAW" selected (an affirmative decision is made in step S103) at the electronic camera for which the WB bracketing is already set (an affirmative decision is made in step S601) is invalidated (step S603). In this situation, the display segment such as an icon indicating the image recording quality 1 "RAW" is made to blink at the display device 112 over the predetermined length of time (step S1041). In addition, if the WB bracketing is set (step S114) for the electronic camera at which the image recording quality 1 "RAW" is already set (an affirmative decision is made in step S602), the image recording quality 1 "RAW" is switched to the image recording quality 2 "TIFF" (step S603). In such a situation, too, the display segment such as an icon indicating the image recording quality 1 "RAW" is made to blink over the predetermined length of time (step S1041). As a result, a warning is provided to notify the photographer that the operation for setting the image recording quality 1 "RAW" is prohibited or to alert the photographer to a setting switch.

During the processing executed in step S1001, S1011, S1021, S1023, S1031, S1041, S1051 or S1052 explained above, the display segment indicating the WB bracketing ON setting and the display segment indicating the image recording quality may both be made to blink over a predetermined length of time. Since the display segments corresponding to the two relevant settings are both made to blink, the photographer is able to ascertain with ease the specific setting which is invalidated by the other setting selection in this case.

In the first-twelfth embodiments, a conflict of the WB bracketing ON setting and the image recording quality 1 "RAW" setting is prevented. Instead, the WB bracketing ON setting and the image recording quality 1 "RAW" setting may be selected at the same time and a selection may be made when recording image data into the recording medium 126 to specify whether the image data having undergone the WB adjustment through the WB bracketing are to be recorded into the recording medium 126 or the image data that have not undergone the image processing are to be recorded into the recording medium 126 at the image recording quality 1 "RAW". In such a case, too, only either the image data before the image processing or the image data after the image processing are selectively recorded into the recording medium 126, and, as a result, the recording medium 126 does not become used up quickly.

While the term "circuit" is used in the explanation given above, as in the arithmetic operation circuit 101 and the image processing circuit 123, the term "circuit" may be replaced with the term "device". For instance, the arithmetic operation circuit 101 and the image processing circuit 123 may be referred to as an arithmetic operation device 101 and an image processing device 123 instead.

The above described embodiments are examples, and various modifications can be made without departing from the spirit and scope of the invention.

What is claimed is:

1. An electronic camera comprising:
   an image-capturing element that captures a subject image and outputs image data;
   an image processing circuit that executes image processing on the image data output by the image-capturing element;
   a recording circuit that records the image data that have not undergone the image processing or the image data having undergone the image processing into a recording medium;
   an image quality recording mode setting circuit that sets a first image quality recording mode in which the image processing circuit executes the image processing on the image data output by the image-capturing element and then the image data having undergone the image processing is recorded into the recording medium, or a second image quality recording mode in which the image data output by the image-capturing element is recorded into the recording medium without executing the image processing on the image data;
   a bracket setting circuit that sets bracketing processing to control the image processing circuit and the recording circuit to change a parameter for the image processing in stages and record a plurality of sets of image data obtained through the image processing executed by using a plurality of parameters resulting from the change made in stages; and
   a control circuit that controls the image quality recording mode setting circuit and the bracket setting circuit to alternatively set the second image quality recording mode and the bracketing processing.

2. An electronic camera according to claim 1, wherein:
   the image processing corresponds to white balance adjustment processing; and
   the bracketing processing corresponds to white balance bracketing.

3. An electronic camera according to claim 1, wherein:
   the control circuit makes a selection by giving priority to the bracketing processing over the second image quality recording mode.

4. An electronic camera according to claim 1, wherein:
   the control circuit makes a selection by giving priority to the second image quality recording mode over the bracketing processing.

5. An electronic camera according to claim 1, wherein:
   the control circuit makes a selection by giving priority to either the bracketing processing or the second image quality recording mode that has been set earlier.

6. An electronic camera according to claim 1, wherein:
   the control circuit makes a selection by giving priority to either the bracketing processing or the second image quality recording mode that is set later.

7. An electronic camera comprising:
   an image-capturing element that captures a subject image and outputs image data;
   an image processing circuit that executes image processing on the image data output by the image-capturing element;
   a recording circuit that records the image data that have not undergone the image processing or the image data having undergone the image processing into a recording medium;
   an image quality recording mode setting circuit that sets a first image quality recording mode in which the image processing circuit executes the image processing on the image data output by the image-capturing element and then the image data having undergone the image processing is recorded into the recording medium, or a second image quality recording mode in which the image data output by the image-capturing element is recorded into the recording medium without executing the image processing on the image data;
   a bracket setting circuit that sets bracketing processing to control the image processing circuit and the recording circuit to change a parameter for the image processing in stages and record a plurality of sets of image data obtained through the image processing executed by using a plurality of parameters resulting from the change made in stages; and
   a control circuit that controls the recording circuit to selectively record either the image data before the image processing or the image data after the image processing if both the bracketing processing and the second image quality recording mode are set.

8. An electronic camera according to claim 7, wherein:
   the image processing corresponds to white balance adjustment processing; and
   the bracketing processing corresponds to white balance bracketing.

9. An electronic camera according to claim 7, wherein:
   the control circuit controls the recording circuit so as to record image data by giving priority to the image data after the image processing over the image data before the image processing.

10. An electronic camera according to claim 7, wherein:
    the control circuit controls the recording circuit so as to record image data by giving priority to the image data before the image processing over the image data after the image processing.

11. An electronic camera according to claim 7, wherein:
    the control circuit controls the recording circuit so as to record image data by giving priority to the image data corresponding to either the bracketing processing or the second image quality recording mode that has been set earlier.

12. An electronic camera according to claim 7, wherein:
    the control circuit controls the recording circuit so as to record image data by giving priority to the image data corresponding to either the bracketing processing or the second image quality recording mode that is set later.

* * * * *